(12) United States Patent
Feeser et al.

(10) Patent No.: US 7,752,487 B1
(45) Date of Patent: Jul. 6, 2010

(54) SYSTEM AND METHOD FOR MANAGING GROUP POLICY BACKUP

(75) Inventors: Colin Lee Feeser, Atlanta, GA (US); Ryan Sean Marks, Birmingham, AL (US)

(73) Assignee: Open Invention Network, LLC, Durham, NC (US)

( * ) Notice: Subject to any disclaimer, the term of this patent is extended or adjusted under 35 U.S.C. 154(b) by 438 days.

(21) Appl. No.: 11/463,152

(22) Filed: Aug. 8, 2006

(51) Int. Cl.
*G06F 11/00* (2006.01)

(52) U.S. Cl. .............................. 714/4; 714/15; 709/223; 707/9

(58) Field of Classification Search ................ 714/4, 714/15; 709/223; 707/9; 719/316
See application file for complete search history.

(56) References Cited

U.S. PATENT DOCUMENTS

| | | | |
|---|---|---|---|
| 6,484,177 | B1 | 11/2002 | Van Huben et al. |
| 7,134,041 | B2 * | 11/2006 | Murray et al. ................ 714/4 |
| 7,299,410 | B2 * | 11/2007 | Kays et al. ................ 715/234 |
| 7,398,529 | B2 * | 7/2008 | Prabakaran et al. ......... 719/316 |
| 7,441,092 | B2 * | 10/2008 | Lyon ........................ 711/162 |
| 2002/0178249 | A1 | 11/2002 | Prabakaran et al. |
| 2003/0115179 | A1 | 6/2003 | Prabakaran et al. |
| 2003/0145317 | A1 | 7/2003 | Chamberlain |
| 2004/0204949 | A1 | 10/2004 | Shaji et al. |
| 2004/0215627 | A1 * | 10/2004 | Whalen et al. ............... 707/100 |
| 2004/0215650 | A1 | 10/2004 | Shaji et al. |
| 2004/0215920 | A1 | 10/2004 | Haas et al. |
| 2005/0036443 | A1 | 2/2005 | Collins |
| 2005/0071470 | A1 | 3/2005 | O'Brien et al. |
| 2005/0091346 | A1 | 4/2005 | Krishnaswami et al. |
| 2005/0193245 | A1 | 9/2005 | Hayden et al. |
| 2005/0240558 | A1 | 10/2005 | Gil et al. |
| 2007/0244897 | A1 * | 10/2007 | Voskuil et al. ................. 707/9 |

FOREIGN PATENT DOCUMENTS

| | | |
|---|---|---|
| JP | 60254254 | 12/1985 |
| JP | 2004259229 | 9/2004 |

OTHER PUBLICATIONS

"Microsoft Technet"—"Backing up, Restoring, Migrating, and Copying GPOs" and "Creating and Working with GPOs" and "Scripting Group Policy tasks using GPMC" by Microsoft Corporation. retreived online on Dec. 16, 2008.*

* cited by examiner

*Primary Examiner*—Philip Guyton

(57) ABSTRACT

A method, system and program product for group policy backup management in an enterprise network having a plurality of domains. A list of group policies for a domain is retrieved and a digital signature is determined for each policy on the list of policies for the domain. The digital signature for each policy in the domain is compared with a corresponding previous digital signature for the same policy. If the current digital signature for each policy matches the corresponding previous digital signature for the same policy, no backup is performed. Each policy having a current digital signature that does not match the corresponding previous digital signature for the same policy is backed up. The preceding steps are repeated for each domain in a plurality of domains within the enterprise network computing environment. Individual policies can also be backed up or restored upon user request. The system contains a group policy backup component for automatically backing up each modified policy in each domain, and a group policy backup manager component for backing up and restoring individual policies in a domain.

17 Claims, 24 Drawing Sheets

```
C:\WINDOWS\System32\sychost.exe

Beginning process to backup Group Policies on selected domains...
- Backing up Group Policies for Energyco.com
    - Found 32 Group Policies in Energyco.com
    - Backup Current for Default Domain Policy
    - Backup Current for Default Domain Controllers Policy
    - Backup Current for DOM-Config-Default Policy
    - Backup Current for SRV-Config-DomainControllerDefaultPolicy
    - Backup Current for SRV-Config-MemberServerDefaultPolicy
    - Backup Current for SRV-Config-ServerBuildDefaultPolicy
    - Backup Current for WKS-Config-Outlets
    - Backup Current for WKS-Config-OfficeXP
    - Backup Current for WKS-Config-Netmeeting
    - Backup Current for WKS-Config-HomeRunXP
    - Backup Current for WKS-Config-ePC
    - Backup Current for SRV-Config-TerminalServer
    - Backup Current for WKS-Config-HomeRunShared
    - Backup Current for USR-Config-DenyDFSAdminPolicy
    - Backup Current for SRV-Config-LegalNoticeCaptionPolicy
    - Backup Current for USR-Config-RemoteVendorPolicy
    - Backup Current for USR-ProcessAcctPolicy
```

```
C:\WINDOWS\System32\sychost.exe

- Found 40 Group Policies in Batusers.energyco.com
    - Backup Current for DOM-PKI-AutoEnrollmentUsers
    - Backup Current for WKS-Config-SoftwareRestriction
    - Backing up USR-Config-RemoteVendorPolicy The task cannot be completed. There was an error with extension [Core Extension]. The attributes for
Directory Services object [LDAP://ALXAPBC04.batusers.energyco.com/cn={151AF751-19F6-498D-9218-
FFFA701FE15C},CN=Policies, CN=System, DC=Batusers, DC=energyco, DC=com] cannot be accessed.
The following error occurred:
The system cannot find the path specified.
    - Backup Current for WKS-Config-OfficeXP
    - Backup Current for Default Domain Policy
    - Backup Current for USR-Config-DenyDFSAdminPolicy
    - Backup Current for SRV-Config-LegalNoticeCaptionPolicy
    - Backup Current for WKS-Config-OutletXP
    - Backup Current for WKS-Software-Windows Uptime
    - Backup Current for WKS-Config-Office2003
    - Backup Current for SRV-Config-ISA-WebPublishingServerServices
    - Backup Current for WKS-Config-InstantMessaging
    - Backup Current for TestSoftwareInstall
    - Backup Current for DOM-Config-DefaultPolicy
    - Backing up Test
```

GPOBackup.log - Notebook

| | |
|---|---|
| 4/28/2006 5:34:59 PM | - |
| 4/28/2006 5:34:59 PM | - |
| 4/28/2006 5:34:59 PM | -Beginning process to backup Group Policies on selected domains |
| 4/28/2006 5:34:59 PM | - |
| 4/28/2006 5:34:59 PM | - - Backing up Group Policies for Energyco.com |
| 4/28/2006 5:34:59 PM | - Found 32 Group Policies in energyco.com |
| 4/28/2006 5:35:03 PM | - Backing up Default Domain Policy |
| 4/28/2006 5:35:18 PM | - Backing up Default Domain Controllers Policy |
| 4/28/2006 5:35:32 PM | - Backing up DOM-CONFIG-DefaultPolicy |
| 4/28/2006 5:35:45 PM | - Backing up SRV-CONFIG-DomainControllerDefault Policy |
| 4/28/2006 5:36:00 PM | - Backing up SRV-CONFIG-MemberServerDefaultPolicy |
| 4/28/2006 5:36:14 PM | - Backing up SRV-CONFIG-ServerBuildDefaultPolicy |
| 4/28/2006 5:36:30 PM | - Backing up WKS-CONFIG-Outlets |
| 4/28/2006 5:37:06 PM | - Backing up WKS-CONFIG-OfficeXP |
| 4/28/2006 5:37:23 PM | - Backing up WKS-CONFIG-NetMeeting |
| 4/28/2006 5:37:36 PM | - Backing up WKS-CONFIG-HomerunXP |
| 4/28/2006 5:38:08 PM | - Backing up WKS-CONFIG-ePC |
| 4/28/2006 5:38:34 PM | - Backing up SRV-CONFIG-TerminalServer |
| 4/28/2006 5:38:53 PM | - Backing up WKS-CONFIG-HomeRunShared |
| 4/28/2006 5:39:03 PM | - Backing up USR-CONFIG-DenyDFSAdminPolicy |
| 4/28/2006 5:39:12 PM | - Backing up SRV-CONFIG-LegalNoticeCaptionPolicy |
| 4/28/2006 5:39:25 PM | - Backing up USR-CONFIG-RemoteVendorPolicy |
| 4/28/2006 5:39:38 PM | - Backing up USR-CONFIG-ProcessAcctPolicy |
| 4/28/2006 5:40:01 PM | - Backing up SRV-CONFIG-LogonScriptVisible |
| 4/28/2006 5:40:13 PM | - Backing up SEC-SoftwareRestrictions |
| 4/28/2006 5:40:27 PM | - Backing up WKS-CONFIG-SecuritySettings |

```
Energyco_Reference.ini - Notepad
File  Edit  Format  View  Help

[{31B2F340-016D-11D2-945F-00C04FB984F9}]
DisplayName=Default Domain Policy
CreationTime=12/8/2205 9:11:56 PM
ModificationTime=2/21/2006 11:42:34 PM
Hash-14-A8-00-F2-F1-82-4E-13-D6-E1-D3-7C-6C-40-SE-8C
[{{6AC1786C-016F-11D2-945F-00C04fB9849F9}]
DisplayName=Default Domain Controllers Policy
CreationTime=12/8/2005 9:19:56 PM
ModificationTime-10/15/2006 9:32:24 PM
Hash-0B-62-FA-9C-AE-C8-A4-A3-24-BE-85-C8-B7-67-91-72
[{93247015-925F-47B0-AE21-8E1443AE6BF0]
DisplayName-DOM-Config-DefaultPolicy
CreationTime=12/9/2005 5:07:12 PM
ModificationTime=2/21/2006 11:51:42 PM
Hash=21-B5-5E-7E-1F-DB-93-81-5F-0A-17-AF-4E-52-02-BE
[{AC7574B1-74F7-46DD-B57D-586E44B73B1A}]
DisplayName=SRV-Config-DomainControllerDefaultPolicy
CreationTime=12/9/2005 5:12:14 PM
ModificationTime=2/21/2006 11:51:42 PM
Hash=3F-27-CB-01-68-7D-56-88-4F-62-F6-B8-EB-DE-46-19
[{{EBED9A6B-EF43-4082-B47B-2D4376866243}]
DisplayName=SRV-Config-MemberServerDefaultPolicy
CreationTime=12/9/2005 5:24:00 PM
ModificationTime=2/21/2006 11:51:42 PM
Hash=1A-C2-8A-9F-E9-F4-B9-F9-FD-F1-48-54-27-C6-8A-E2
[{{009D26F4-3263-43B3-87B6-55558EA1E41F}]
DisplayName=SRV-Config-ServerBuildDefaultPolicy
CreationTime=12/15/2005 11:12:20 AM
ModificationTime=2/21/2006 11:51:42 PM
Hash=7F-99-05-E9-D5-63-97-87-33-65-90-81-67-4E-30-D9
[{{43E96A5C-AC9F-4794-B5DE-8208A1A60E7B}]
DisplayName=WKS-Config-Outlets
CreationTime=1/26/2006 1:46:52 PM
```

SYSTEM AND METHOD FOR MANAGING GROUP POLICY BACKUP

BACKGROUND OF THE INVENTION

The present invention relates generally to group policy management in an enterprise computer network and, more specifically, to automated techniques for backing up and restoring group policy objects from multiple network domains.

A group policy object is a collection of settings for defining configurations for both servers and user machines. Local policy settings can be applied to all machines and for those that are part of a domain. For Windows-based platforms, the group policy object is associated with selected Active Directory containers, such as sites, domains or organizational units. A domain is a single security boundary of a Windows-based computer network. Every domain has its own security policies and security relationships with other domains in the Active Directory. Group policy provides centralized management of computers and users in an Active Directory environment. A Group Policy Management Console (GPMC) is a Microsoft-provided tool that includes a set of scriptable interfaces for enabling a user to create a group policy object that defines registry-based policies, security options, software installation and maintenance options, script options and folder redirection options. The GPMC can manage both Windows 2000 and Windows Server 2003 domains with Active Directory. However, the scripts that are bundled with GPMC are console driven and not switchable for large scale backup and restore operations.

There is a need for an automated method for backing up group policy objects on a periodic basis and restoring specific group policy objects in a disaster recovery situation for a large enterprise computer network when group policy objects become corrupted.

SUMMARY OF THE INVENTION

The present invention is directed to a system and method for rapid disaster recovery when a group policy becomes corrupted in a large Windows Server Active Directory-based network. The invention includes two software components: GPOBackup and GPOBackupMgr. Both software components use an initialization file for configuration purposes. In an exemplary embodiment, both applications operate by utilizing the Group Policy Management Console (GPMC).

The Group Policy Object Backup (GPOBackup) component of the invention is a console-based utility designed to be run from one machine in a network from the system task scheduler. The GPOBackup component uses a parameter file to assign a list of domains from which to back up all Group Policy Objects (GPOs) installed in the Active Directory. The function of the GPOBackup component is to run periodically and back up all group policy objects from all domains in the list of domains. A group policy object is a collection of settings that define what a system will look like and how it will behave for a defined group of users. The policy setting information of a GPO is actually stored in two locations: the Group Policy Container (GPC) and the Group Policy Template (GPT). The GPC is an Active Directory container that stores GPO properties, including information on version, GPO status, and a list of components that have settings in the GPO. The GPT is a folder structure within the file system that stores administrative template-based policies, security settings, script files, and information regarding applications that are available for software installation. The inventive process backs up these policies to a network share, which is also assigned in the parameter file. After the first backup is made, the utility creates a digital hash table, which it then compares the next time it checks to see if a backup should be made. Once a backup is made, it will check this hash at each cycle and only backup group policies that have changed since the last successful backup. After each cycle, an email report can be sent to a set of email addresses listed in the parameter file containing the changes found in the modified policy and/or any errors that occurred during the backup process. A difference report is generated each time there is a successful policy backup based on the comparison step. If no changes are made to any policies since the last successful backup, no backups will be made. If there are no backups during a backup cycle and there are no errors, an email report will not be sent out. A log file is also kept of the complete activity of the backup process.

The Group Policy Object Backup Manager (GPOBackupMgr) component is a GUI-based utility that is designed to be run from any number of machines. Its function is to provide an easy and intuitive tool for the purpose of backing up individual GPOs, comparing backed-up GPOs to what is currently installed in the domain, creating GPO reports and restoring GPOs back to the domain from selected backups. The GPOBackupMgr is launched from a server customizer tool in an emergency situation to restore a GPO that has been corrupted and is causing system problems. A server customizer tool is described in a co-pending, commonly assigned patent application entitled "System and Method for Server Customization," application Ser. No. 11/407,659, filed on Apr. 20, 2006. The disclosure of this patent application is incorporated by reference in its entirety herein.

In one aspect of the invention, a method and computer product are provided for group policy backup management in an enterprise network having a plurality of domains. A list of group policies for a domain is retrieved and a digital signature is determined for each policy on the list of policies for the domain. The digital signature for each policy in the domain is compared with a corresponding previous digital signature for the same policy. If the current digital signature for each policy matches the corresponding previous digital signature for the same policy, no backup is performed. Each policy having a current digital signature that does not match the corresponding previous digital signature for the same policy is backed up. The preceding steps are repeated for each domain in a plurality of domains within the enterprise network computing environment.

In another aspect of the invention, a method and computer product are provided for managing a group policy in an enterprise network having a plurality of domains. A list of domains that have policy backups is displayed to the user who selects a domain from the list. A list of policies in the selected domain is displayed to the user who selects an individual policy from the displayed list. Each policy backup for the selected individual policy is displayed to the user. The user submits a request that the individual policy should be modified. The individual policy is modified by either backing up the individual policy or restoring a previous backup of the individual policy.

In yet another aspect of the invention, a system is provided for managing group policy backup in an enterprise network having a plurality of domains. The system includes a group policy backup component operating on a processor for automatically backing up each modified policy in each domain, and a group policy backup manager component operating on the processor, and cooperative with the group policy backup component, for backing up and restoring individual policies in a domain.

BRIEF DESCRIPTION OF THE DRAWINGS

These and other advantages and aspects of the present invention will become apparent and more readily appreciated from the following detailed description of the invention taken in conjunction with the accompanying drawings, as follows.

FIG. 5 illustrates an exemplary display during operation of the GPOBackup utility as it begins a standard backup cycle.

FIG. 6 illustrates an exemplary display showing that the GPOBackup utility has completed backup of group policy objects in one domain and has moved to the next domain.

FIG. 9 illustrates an exemplary display of the log file that is generated by running the GPOBackup utility.

FIG. 11 illustrates an exemplary display of a domain name reference initialization file.

FIG. 14 illustrates an exemplary display of an email report sent after a standard backup process.

DETAILED DESCRIPTION OF THE INVENTION

Figure 1:
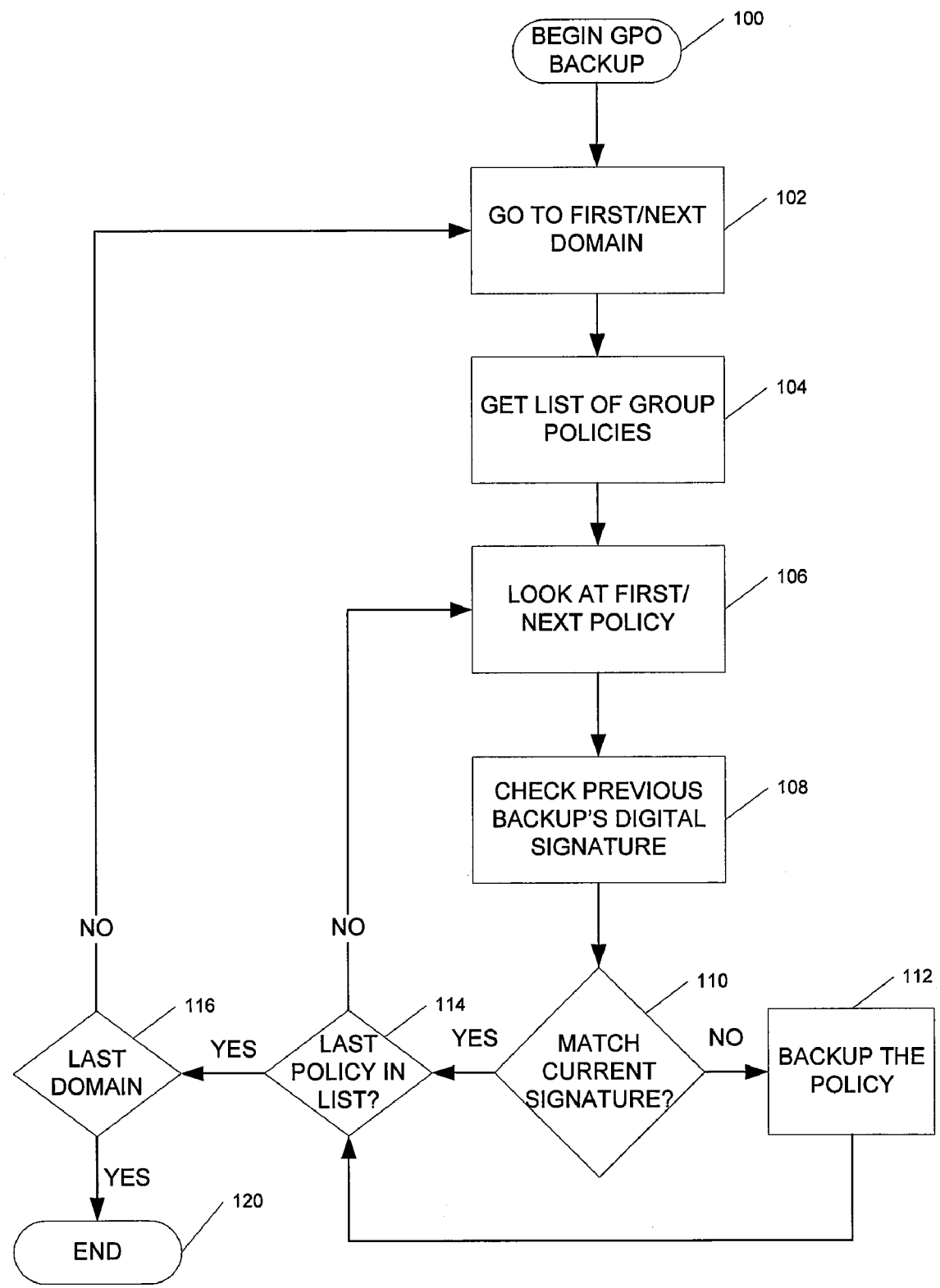
FIG. 1 illustrates processing logic for the group policy backup manager utility in accordance with an exemplary embodiment of the invention.

The following description of the invention is provided as an enabling teaching of the invention and its best, currently known embodiment. Those skilled in the art will recognize that many changes can be made to the embodiments described while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations of the invention are possible and may even be desirable in certain circumstances and are part of the present invention. Thus, the following description is provided as illustrative of the principles of the invention and not in limitation thereof since the scope of the present invention is defined by the claims.

The following exemplary embodiment of the invention is described in terms of the Microsoft .NET framework and the C# high level language. C# is a language derived from C++ by Microsoft for the .NET Framework. C# doesn't use pointers, has single inheritance, does not have macro support, and does not have template support. Single inheritance means that a class can only derive from at most one other class. When a class inherits from another class, it gains all the properties, methods, fields, events, and constructors from the class from which it inherited (i.e., the base class). The class that inherits from the base class is referred to as the derived class.

The Group Policy Backup Manager (GPOBackupMgr) of the invention enables rapid disaster recovery when a group policy object becomes corrupted on a large Windows Server Active Directory based network. GPOBackupMgr includes two components: GPOBackup and GPOBackupMgr. Both applications use an initialization file for configuration purposes. Both applications can utilize the Group Policy Management Console (GPMC) for operation. GPOBackupMgr can install GPMC on a machine if it is not already installed from a location designated in the parameters file. Both utilities are written in C# and utilize the .Net Framework in an exemplary embodiment.

GPOBackup is a console-based utility designed to be run from one machine on the network from the system task scheduler. It uses the parameter file to assign a list of domains from which to backup all Group Policy Objects (GPOs) installed in the active directory. Its function is to run periodically and backup all GPOs from all domains in the list. The process backs up these policies to a network share which is also assigned in the parameter file. After the first backup is made, the GPOBackup utility creates a digital hash table which it then compares the next time it checks to see if a backup should be made. Various well-known hash functions (i.e., algorithms) are suitable for performing this step. Examples include the message-digest hash functions MD2, MD4 and MD5, and the Secure Hash Algorithm (SHA). Once a backup has been made, GPOBackup will check this hash at each cycle and only backup group policies which have changed since the last successful backup. After each cycle, GPO-Backup optionally can send an email report to a set of email addresses listed in the parameters file containing the changes found in the modified policy and/or any errors which occurred during the backup process. Note that if no changes are made to any policies since the last successful backup, no backups will be made. If no backups are made during a backup cycle and there are no errors, an email report will not be sent out. A log file is also kept of the complete activity of the backup process.

Group Policy Object Backup Component

FIG. 1 illustrates a high level overview of the processing logic for the group policy backup manager utility in an exemplary embodiment of the invention. The GPO backup begins in logic block 100. The processing logic starts with the first domain as indicated in logic block 102. The list of group policies for the domain is retrieved as indicated in logic block 104. The first policy on the list is then examined as indicated in logic block 106. The processing logic checks the previous backup's digital signature as indicated in logic block 108. Next, a determination is made in decision block 110 as to whether or not the current digital signature matches the previous digital signature for the policy if a previous digital signature exists. If the current and previous digital signatures for the policy are found to match, processing continues in decision block 114 with a determination as to whether or not there are any other policies to evaluate in the retrieved list. If the current and previous digital signatures for the policy do not match, or if a previous digital signature does not exist then the current policy is backed up, or stored if no previous backup exists, as indicated in logic block 112, followed by testing for any other policies to evaluate in decision block 114. If there are more policies to evaluate in the list, the processing logic returns to logic block 106 to examine the next policy. Otherwise, the last policy in the list has been evaluated, and processing continues in decision block 116 to determine if there are any other domains to evaluate. If there are more domains to evaluate, processing returns to logic block 102 to evaluate the next domain. When the last domain has been evaluated, processing exits at termination block 120.

GPOBackupMgr is a GUI-based utility designed to be run from any number of machines. The function of GPOBackupMgr is to provide an easy and intuitive tool for the purpose of backing up individual GPOs, comparing backed-up GPOs to GPOs currently installed on the domain, creating GPO reports and restoring GPOs back to the domain from the selected backups.

In the exemplary embodiment described herein, GPMC must be installed on the machine before GPOBackup can operate. Once GPMC is installed, GPOBackup can be installed by copying three specific files to a folder on the backup PC: GPOBackup.exe, GPOBackup.ini and a Microsoft group policy dynamic link library (DLL). As is well known in the art, a DLL is a library of software modules that can be accessed and executed by other programs. DLL files do not get loaded into random access memory (RAM) until needed by another program. DLL files are dynamically linked with the program that calls them during program execution rather than being compiled with the calling program. Once the installation of GPOBackup is complete, the procedure is set up to run in the system task scheduler.

GPOBackup is configured by making custom changes to the GPOBackup.ini file. When GPOBackup.exe is run, it looks for an initialization file with the exact same name but with the "ini" extension. The GPOBackup.exe can be renamed as long as the corresponding "ini" file changes its name to match.

Figure 2:
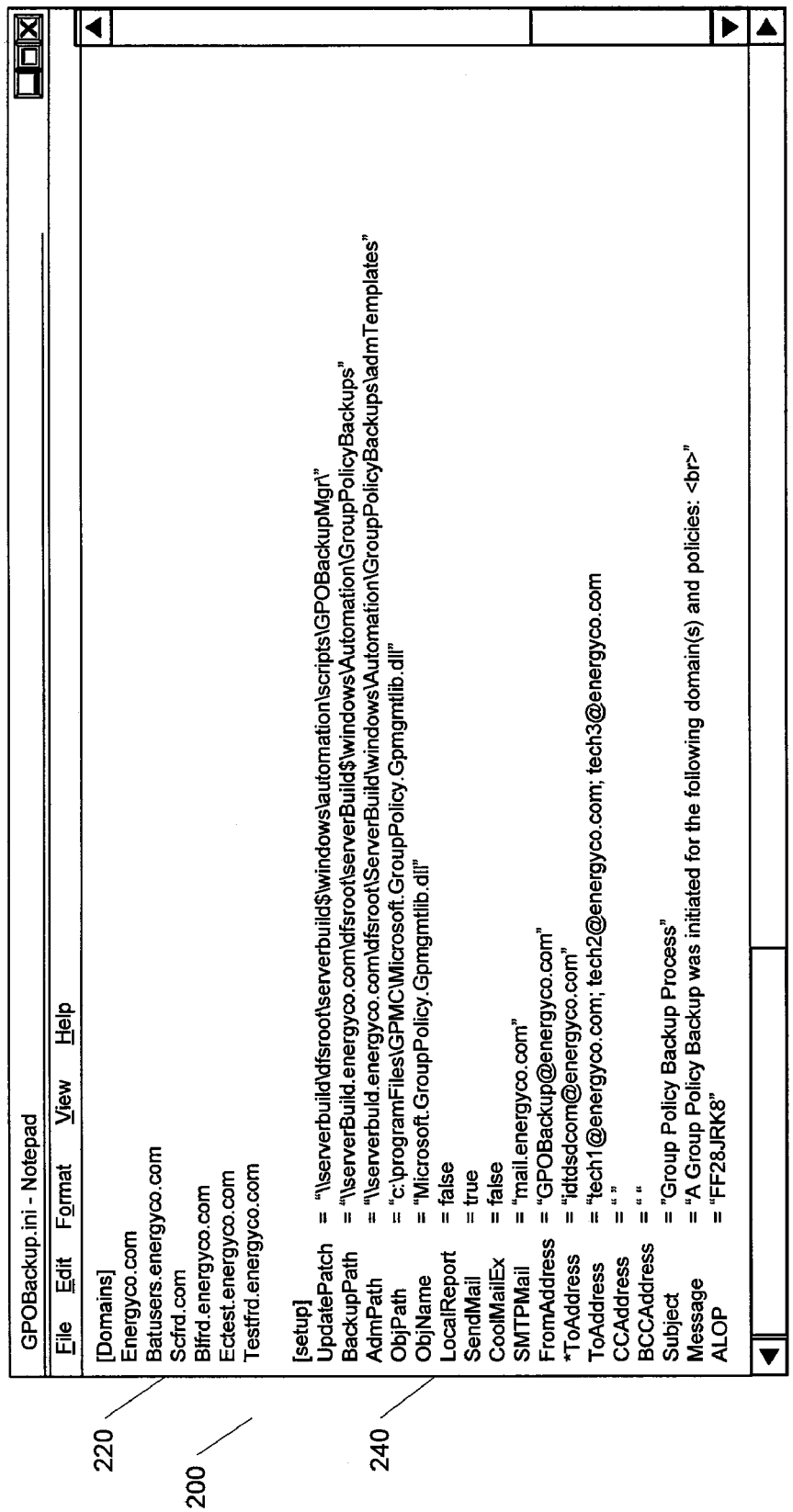
FIG. 2 illustrates an exemplary initialization configuration file for the group policy backup manager utility.

FIG. 2 illustrates an exemplary initialization configuration file 200 for GPOBackup. The format of the configuration file contains two sections, "domains" 220 and "setup" 240, identified by square brackets.

The "domains" section 220 is followed by a list of the domains from which group policy backups will be made. In most cases it is preferable to use the fully qualified domain name (FQDN).

The "setup" section 240 contains very specific values that will modify the operation of GPOBackup. The following is the list of definitions and explanations for each value.

UpdatePath—specifies the full path to the network share to which the "gold" copy of the files required for GPOBackup to operate are stored. Each time GPOBackup is started, it checks this path for updated versions of the group policy backup initialization file, the Microsoft group policy dynamic link library and the group policy backup executable. If an update is found, GPOBackup will automatically update itself.

BackupPath—specifies the full path to the network share to which the backups will be stored. This is the root path. GPOBackup will create a special folder for each domain, group policy object and backup of that policy under this path.

AdmPath—specifies the location of the "gold" administrative template files which are used to format the group policy reports. GPOBackup will use these templates to format the reports and difference reports during the backup process rather than the ones on the machine the process is being run from or those on the domain controller.

ObjPath—points to the location of the Microsoft group policy dynamic link library file required for the proper operation. Since the path listed by default is the location to which GPMC installs, this should not have to be changed unless the default installation of GPMC is changed. The default path is "C:\Program Files\GPMC\Microsoft.GroupPolicy.GpmgmtLib.dll".

ObjName—specifies the standalone name of the object dynamic link library. The default name is Microsoft.GroupPolicy.GpmgmtLib.dll and should not be changed unless the code dependency changes.

LocalReport—a simple Boolean "true" or "false" statement. LocalReport specifies whether GPOBackup should attempt to write the current reports to the administrative (ADM) folder of the policy under the system volume (SysVol) share on the primary domain controller (PDC). A "true" value will cause GPOBackup to attempt to write the report. A "false" will cause it to skip this step. This feature is offered as a switch because there are cases where the credentials used to backup the reports may have access to the Active Directory, therefore the policies for backup purposes, the same ID may not have the ability to write to the Windows System32 folder on the PDC.

SendMail—a Boolean setting which determines whether GPOBackup will send an email report at the end of each backup cycle, if a backup is made, or if there were errors in the backup. The GPOBackup utility has two methods by which it can send email: (1) "CoolMailEx," a predefined component object model (COM) object used for allowing email on a machine which may not have an email client installed, or (2) standard Simple Mail Transport Protocol (SMTP) mail if an SMTP mail server is available. Some enterprises may prefer the more secure CoolMailEx COM object if the locations where GPOBackup will be running are not contained within a secure environment. The selection of the SendMail is configurable via the Boolean statements which follow. It is possible to use both methods, in which case, multiple emails will be sent.

CoolMailEx—a Boolean setting that determines if the predefined CoolMailEx COM object is used for sending email reports at the end of each backup cycle.

SMTPMail—a Boolean setting that determines if the standard SMTP mail process is used for sending email reports at the end of each backup cycle. If the standard SMTP mail process is used, the following setting of the SMTP server must be correct in order to be successful.

SMTPServer—the IP address, Domain Name Service (DNS) name or DNS canonical name (Cname) of an available SMTP server. This setting is required if SMTPMail is set to "true." An error will be generated in the log file if GPOBackup is not able to reach the address set here. If SMTPMail settings are correct, the log file will state "SMTP mail message sent" at the end of each backup cycle where there are successful backups and/or errors.

FromAddress—the address used by GPOBackup when it sends an email message. This address will be placed in the "From" field of the message. This setting is required for the email function to work correctly.

ToAddress—the semi-colon delimited list of email addresses to which the email messages will be sent. This setting is required for the email function to work correctly.

CCAddress—an optional setting in the case where email addresses are desired to be "carbon copied" during the email process. If this is not desired, empty quotes or a blank after the equals sign should be used instead.

BCCAddress—an optional setting in the case where email address are desired to be "blind carbon copied" during the email process. If this is not desired, empty quotes or a blank after the equals sign should be used instead.

Subject—the entry that will be used on the "Subject" line of the email.

Message—the entry that will be the opening statement of the email message. The rest of the email will be automatically generated based upon specific backups and/or error messages as a result of the backup process.

ALOP—the "Application Log On Password" that is required for CoolMailEx to work correctly. This password must be registered with the COM object and will only work for GPOBackup.exe.

Figure 3:
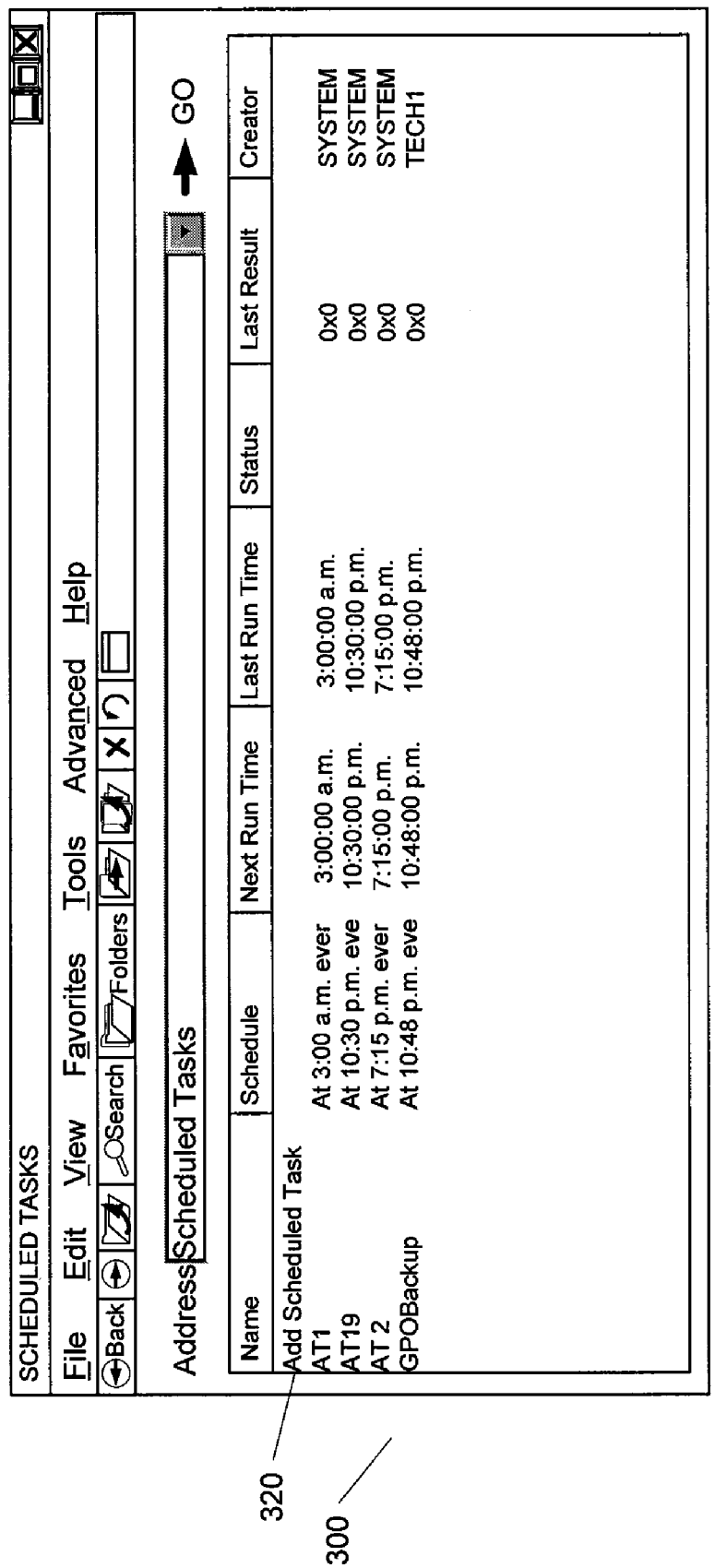
FIG. 3 illustrates an exemplary scheduled tasks window for adding a group policy backup task to be run.
Figure 4:
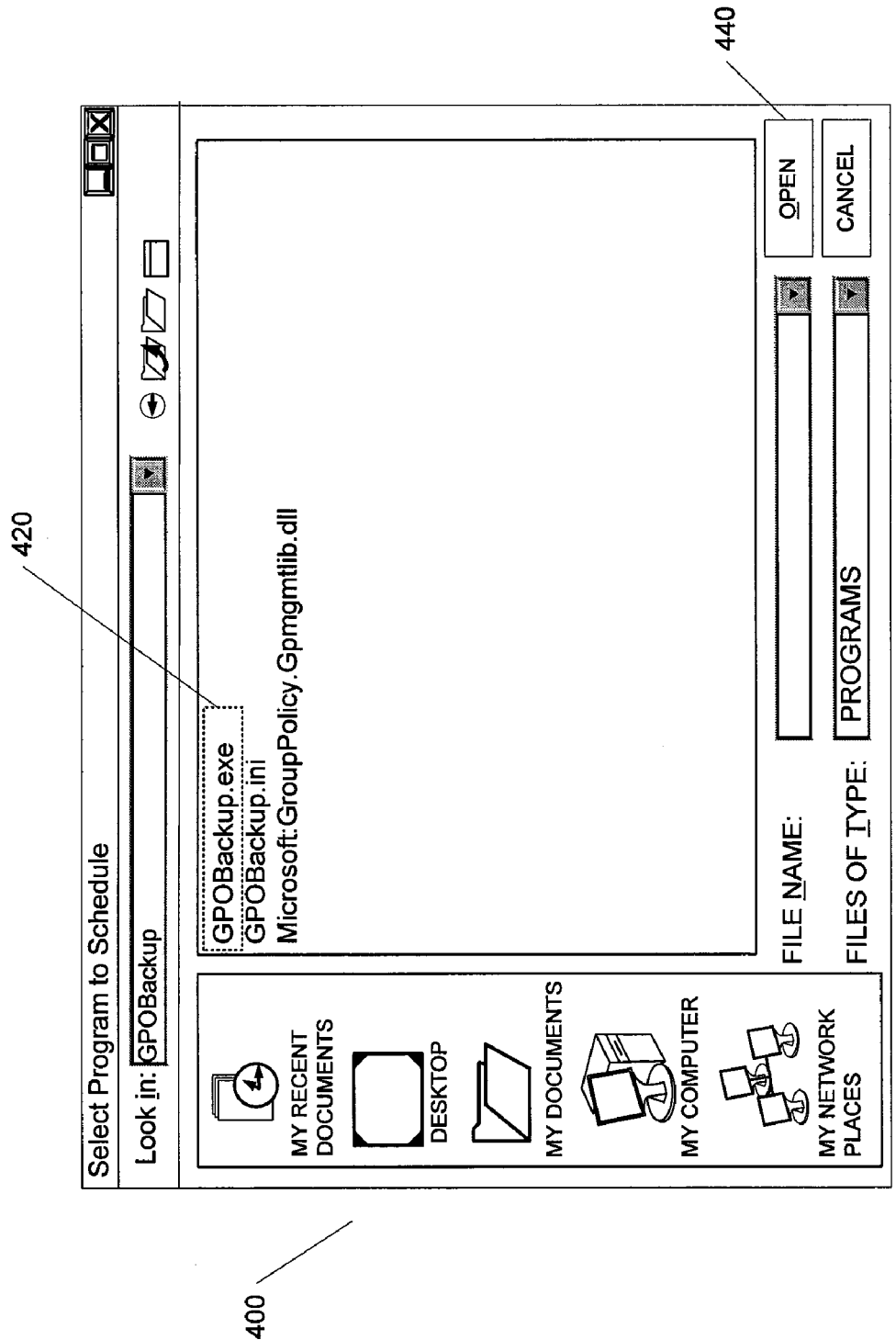
FIG. 4 illustrates an exemplary window for selecting GPO-Backup executable as a scheduled task.

To set up GPOBackup as a scheduled task from a particular personal computer, the user goes to the Windows "Start" menu and selects Programs\Accessories\System Tools\Scheduled Tasks. This will result in a window 300 similar to that shown in FIG. 3 being displayed. The user double clicks on "Add Scheduled Task" 320 and is then prompted with the scheduled task wizard (not shown). The scheduled task wizard enables the user to migrate to the location where the GPOBackup files were installed. FIG. 4 illustrates an exemplary display. On this display 400, the user selects GPOBackup.exe 420 and clicks "Open" 440. The scheduled task wizard enables the user to select the frequency at which the group policy backups are to take place. The user then sets the time that the group policy backup will begin. The user can set the group policy backups to only run on weekdays at this point. The user also enters the date that the group policy backups are to begin.

The scheduled task wizard provides a screen that prompts the user to input a user identifier (ID) and password from which to run the group policy backups. The ID that is entered must have sufficient privileges to access all policy objects in all of the domains being backed up. In many cases, a special process account may be created with this privilege specifically to perform the group policy backup function. The scheduled task wizard shows a final screen indicating that the task will be performed at the designated time.

FIG. 5 illustrates an exemplary display 500 during operation of the GPOBackup utility as it begins a standard backup cycle. As shown in the figure, all of the policies encountered by the GPOBackup utility are already up to date and no backup is necessary.

FIG. 6 illustrates an exemplary display 600 showing that the GPOBackup utility has completed backup of group policy objects in one domain and has moved to the next domain. As shown, an error has been generated when trying to backup one of the policy objects. In the lower part of the display, there is also an example of a successful backup. Both messages will show up in the email report that will be generated as well as in the log file. The successful backup will generate a HyperText Markup Language (HTML) difference report which will show the changes that were made to the policy since the last successful backup.

Figure 7:
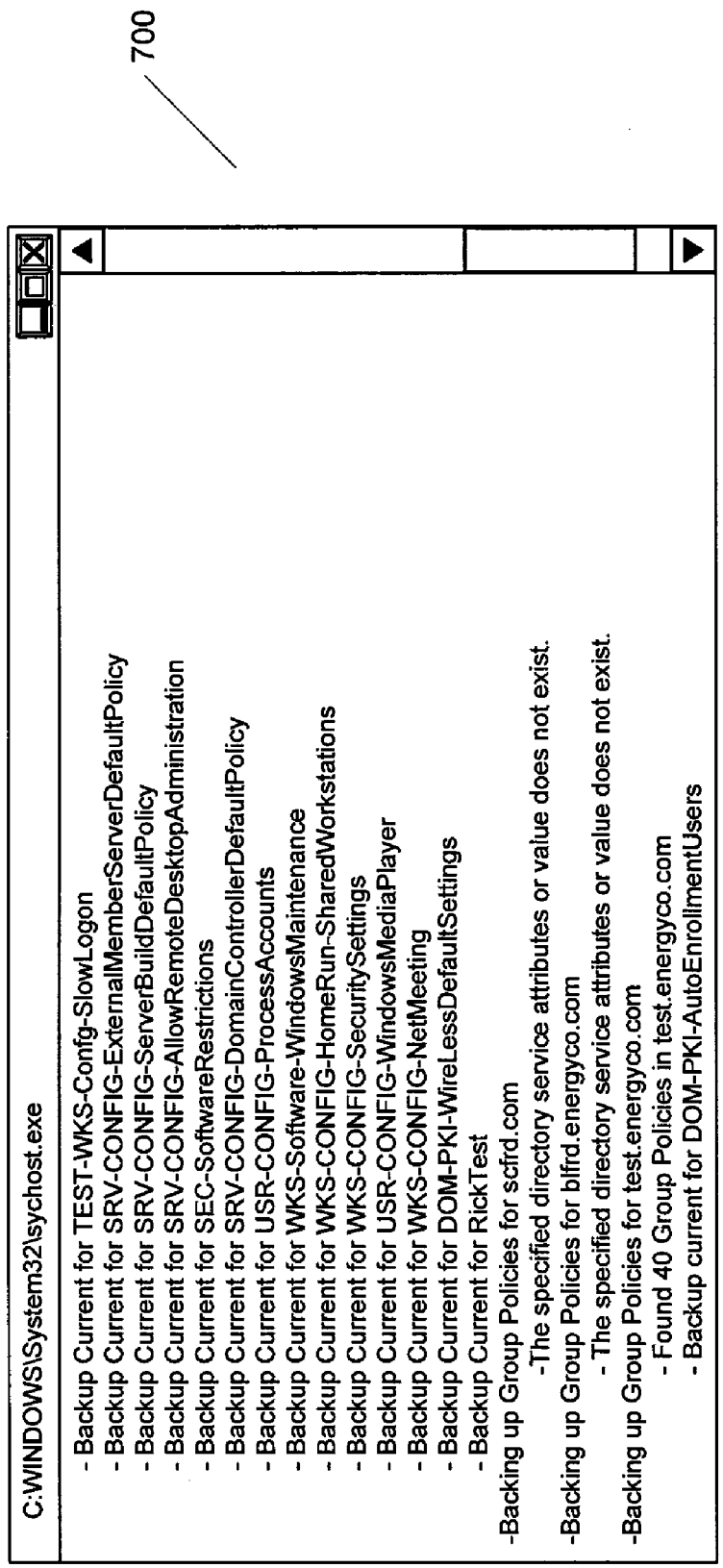
FIG. 7 illustrates an exemplary display showing an error that is generated when the credentials used to run GPO-Backup do not have access to a domain.

FIG. 7 illustrates an exemplary display 700 showing an error that is generated when the credentials used to run GPO-Backup do not have access to a domain. This message will show up in the email report which will be generated as well as in the log file.

Figure 8:
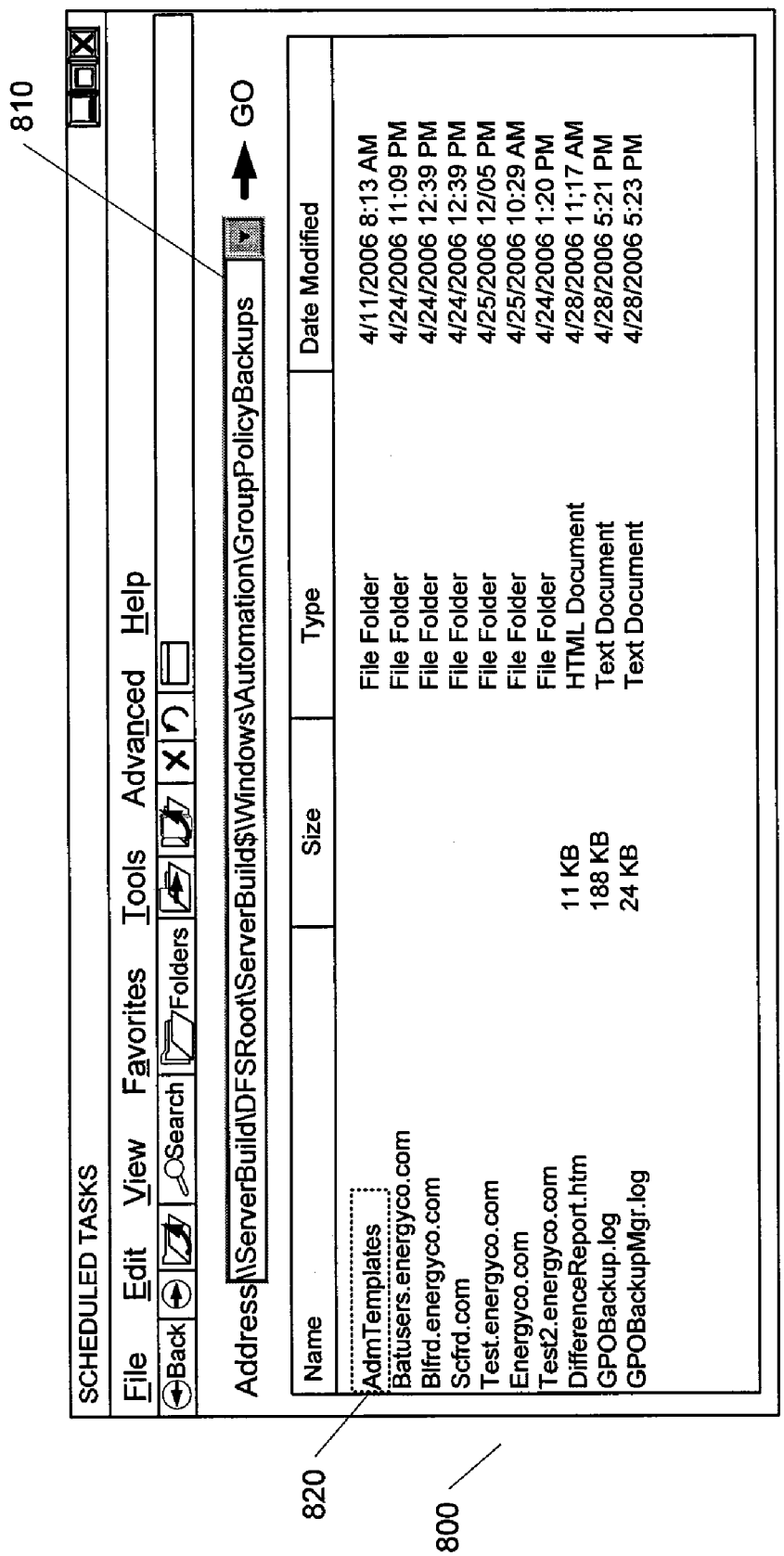
FIG. 8 illustrates an exemplary display showing the root path where GPOBackup places all of the group policy backups.

FIG. 8 illustrates an exemplary display 800 showing the root path 810 where GPOBackup places all of the group policy backups. The "AdmTemplates" folder 820 is the folder in which the "gold" copies of the administrative templates (.adm files) are stored. It should be noted that there is a separate folder for each domain. All of the policy backups are stored under the domain folder.

FIG. 9 illustrates an exemplary display 900 showing an example of the log file that is generated by running the GPO-Backup utility. Everything that is reported to the console is reported here also, with the added exception of the date and time stamp of every activity.

Figure 10:
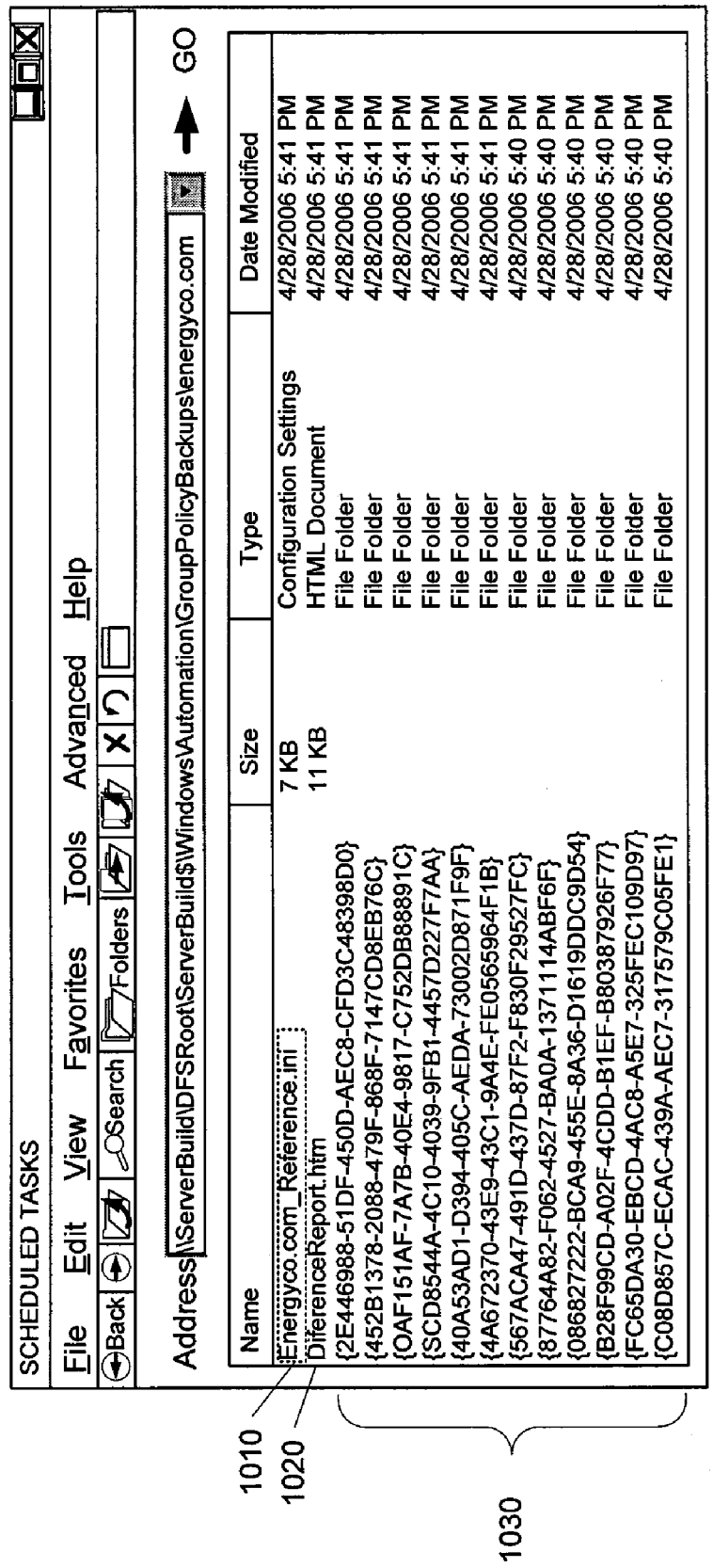
FIG. 10 illustrates an exemplary display of a domain folder.

FIG. 10 illustrates an exemplary display 1000 of a domain folder. Each globally unique identifier (GUID) folder 1030 is a separate policy. The accumulated backups of each policy are contained under its individual GUID folder. The Domain-Name Reference.ini file 1010 contains the cross-reference information on each policy as well as the create time, modify time and the digital hash used for backup comparisons. The DifferenceReport.htm 1020 is an HTML report generated at the last group policy backup which shows the differences between the domain policies as of the last backup and the previous backup, if there were any changes.

FIG. 11 illustrates an exemplary display 1100 of a domain name reference initialization file. It should be noted that that the file is listed in sections by GUID. Each section contains the display name, creation time, modification time and the digital hash from the last backup.

Figure 12:
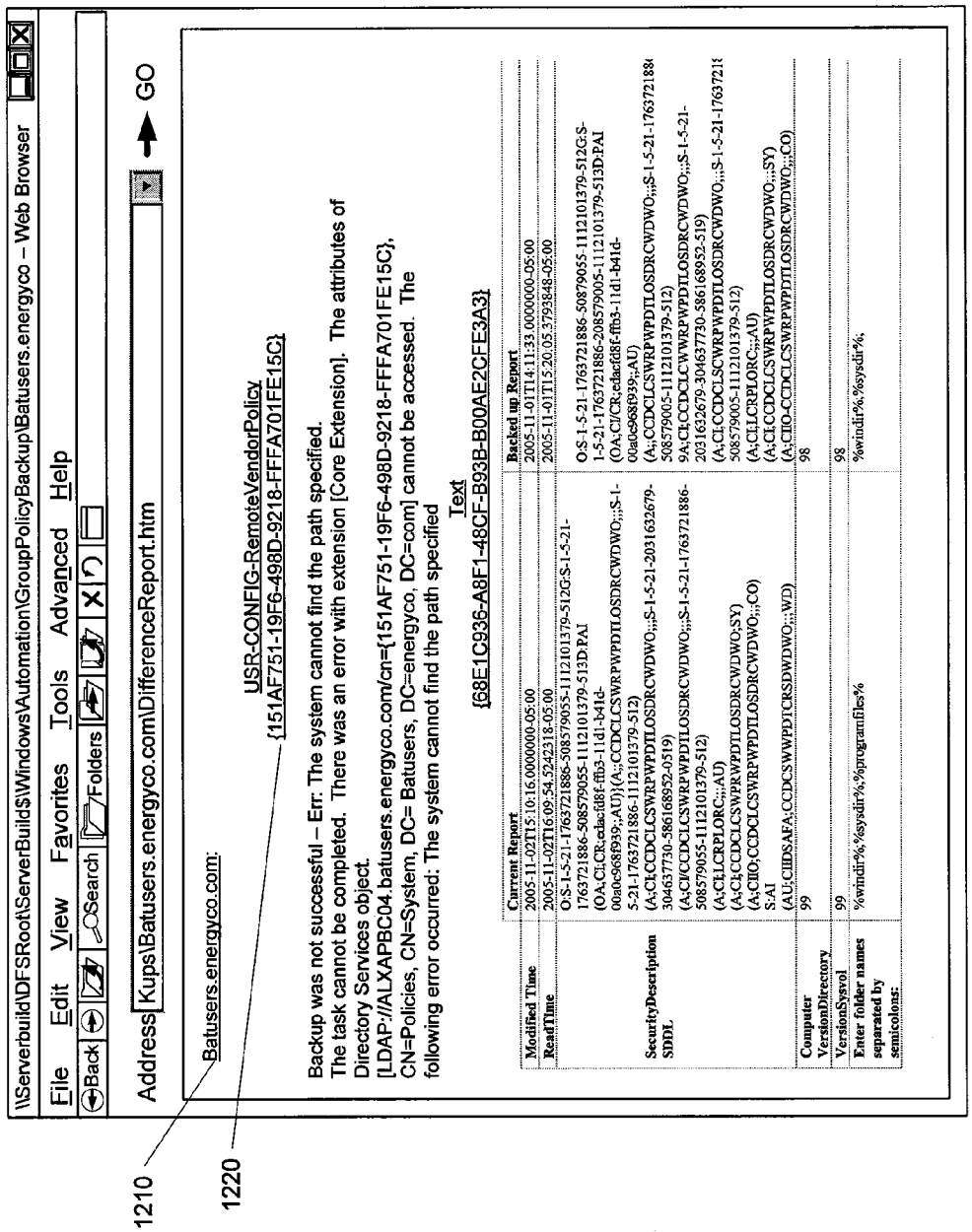
FIG. 12 illustrates an exemplary display of a difference report for a specified domain.

FIG. 12 illustrates an exemplary display 1200 of a difference report for a specified domain. The report contains both domain 1210 and policy links 1220 near the top of the difference report. The domain link 1210 redirects to the domain backup folder. The policy link 1220 launches a full policy report for the policy as it was as of the last backup. A new difference report is generated each time there is a successful policy backup. There is also an accumulated report by domain and successful backed up policies at the root level of the backup path.

Figure 13:
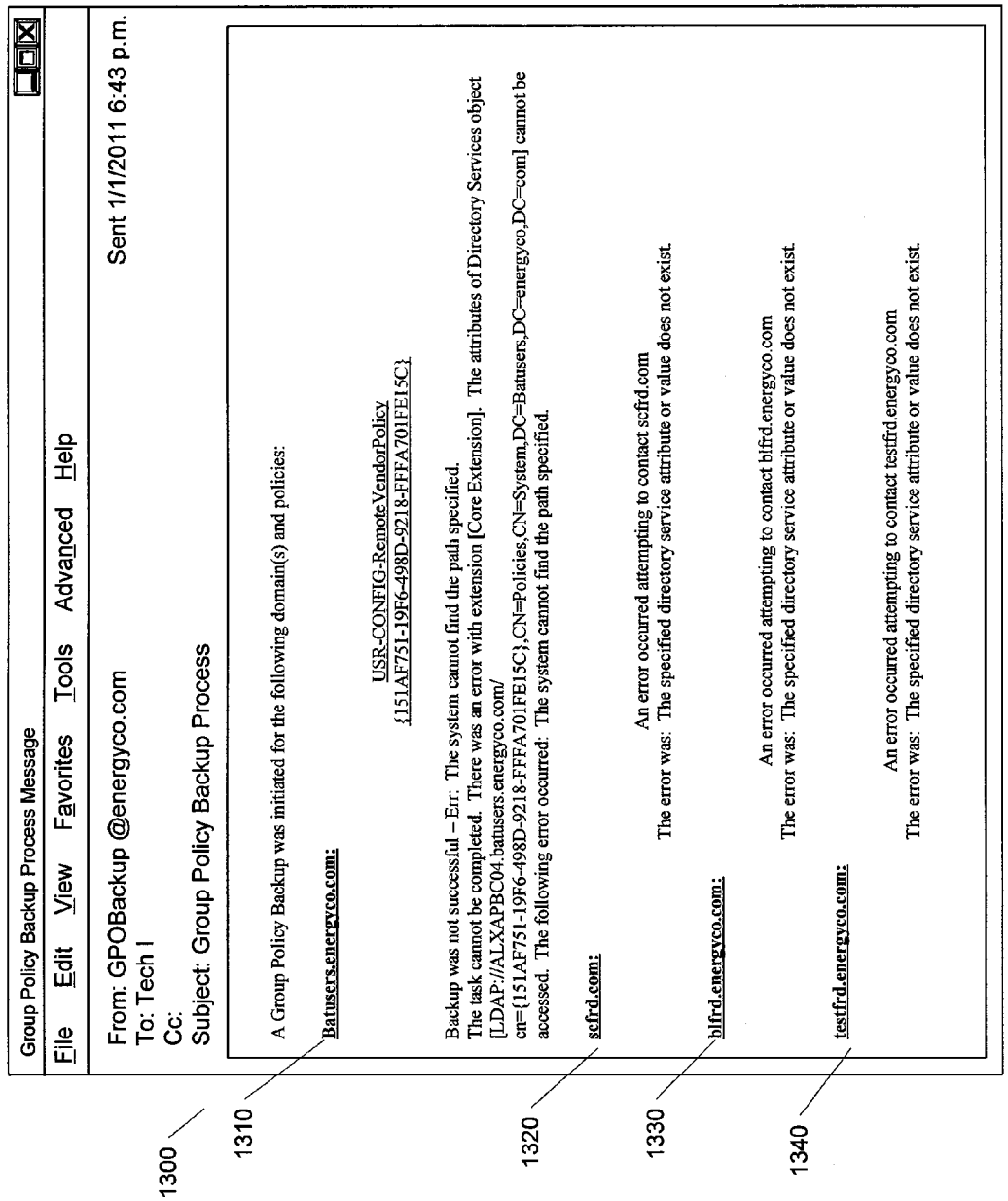
FIG. 13 illustrates an exemplary display of an email report containing the errors which occurred during the backup attempt.

FIG. 13 illustrates exemplary display 1300 of an email report containing the errors which occurred during the backup attempt. In this example, there were no successful backups during the group policy backup process. There is a link 1310, 1320, 1330, 1340 for each domain where a successful or unsuccessful backup attempt was made. By clicking on one of the links, the user will be taken to the folder where all of the policies for that domain are backed up. As shown, three of the domains 1320, 1330, 1340 had a problem being contacted at all. In this example, the errors are due to a rights issue. The ID used to run the backup process turned out to have Active Directory block assigned, preventing it from being able to read the Active Directory structure necessary to create the backup. The domain "Batusers.energyco.com" attempted to backup on policy for which it had a problem. In this example, the policy was not set up correctly and will have to be reapplied. All of the other policies in the other domains being monitored have been successfully backed up in the past and no changes have occurred since that time to require a backup.

Figure 14:
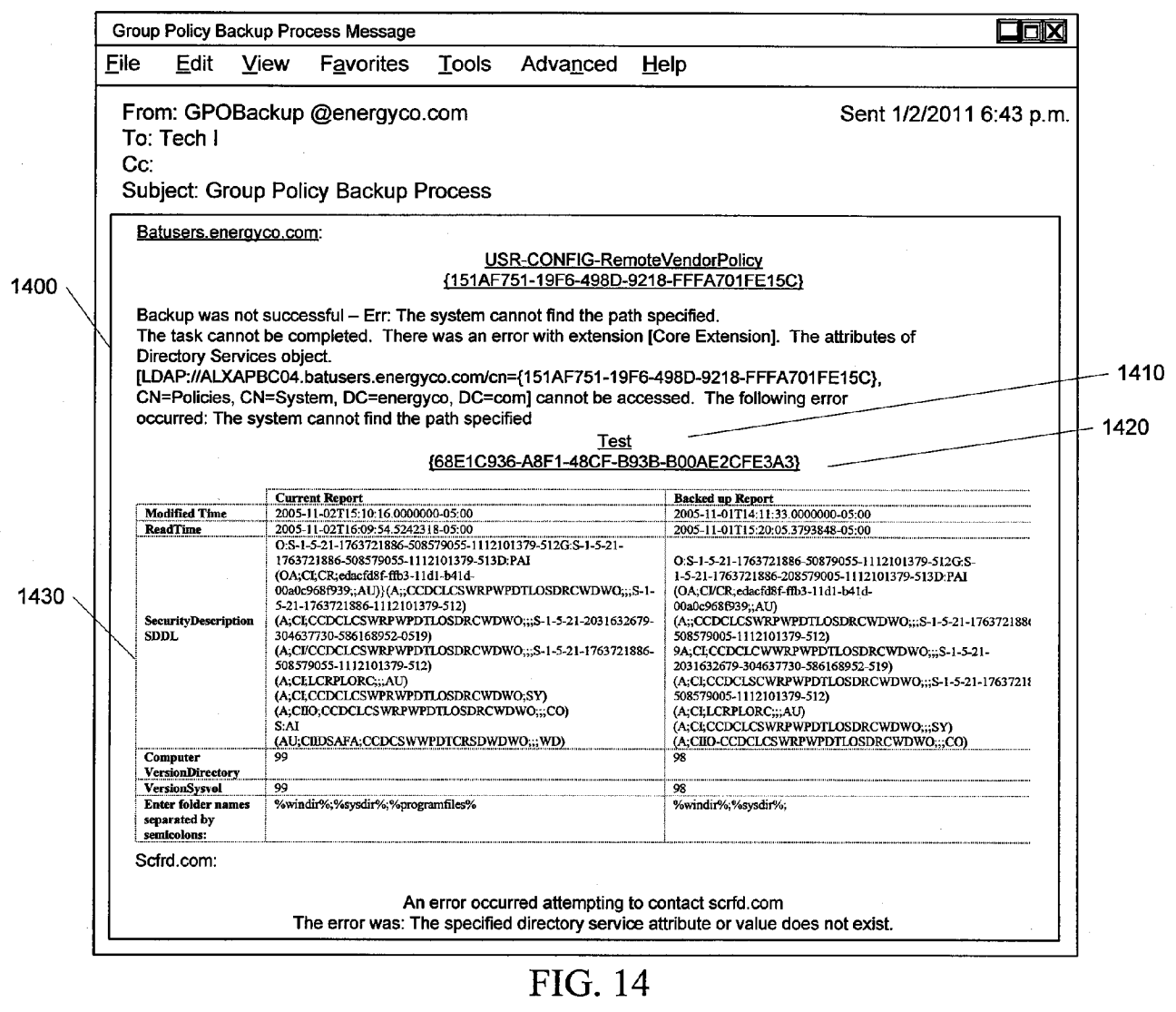

FIG. 14 illustrates an exemplary display 1400 of an email report sent after a standard backup process. In this example, a change occurred in a policy since the last backup process prompting a new backup. The successful backup was of a policy named "Test." The report shows the display name of the policy 1410 as well as the GUID 1420. These are both links from which the full report of the current policy can be launched. The table 1430 in the lower part of FIG. 14 shows the differences between the previous backup and the current policy. The first rows of the table show standard increments of change. These rows are labeled "Modified Time", "Read Time", "Security Descriptor", "Computer Version Directory" and "Version Sysvol", respectively. The last row ("Enter folder names . . . ") shows the actual change to the policy where another folder was added to those affected by the policy.

Group Policy Object Backup Manager Component

The GPOBackupMgr component is installed by copying three files: GPOBackupMgr.exe, GPOBackupMgr.ini and the Microsoft group policy dynamic link library (DLL) to any folder on the client machine. If GPMC is not installed on the machine, GPOBackupMgr will attempt to install it based upon an install path in the GPOBackupMgr.ini file. If GPMC does not install correctly, GPOBackupMgr will display an error message and then exit.

GPOBackupMgr is configured by making custom changes to the GPOBackup.ini file. When GPOBackupMgr.exe runs, it looks for an initialization file with the exact same name with the exception of the extension. It is possible to rename GPOBackupMgr.exe as long as the initialization file changes its name to match.

Figure 15:
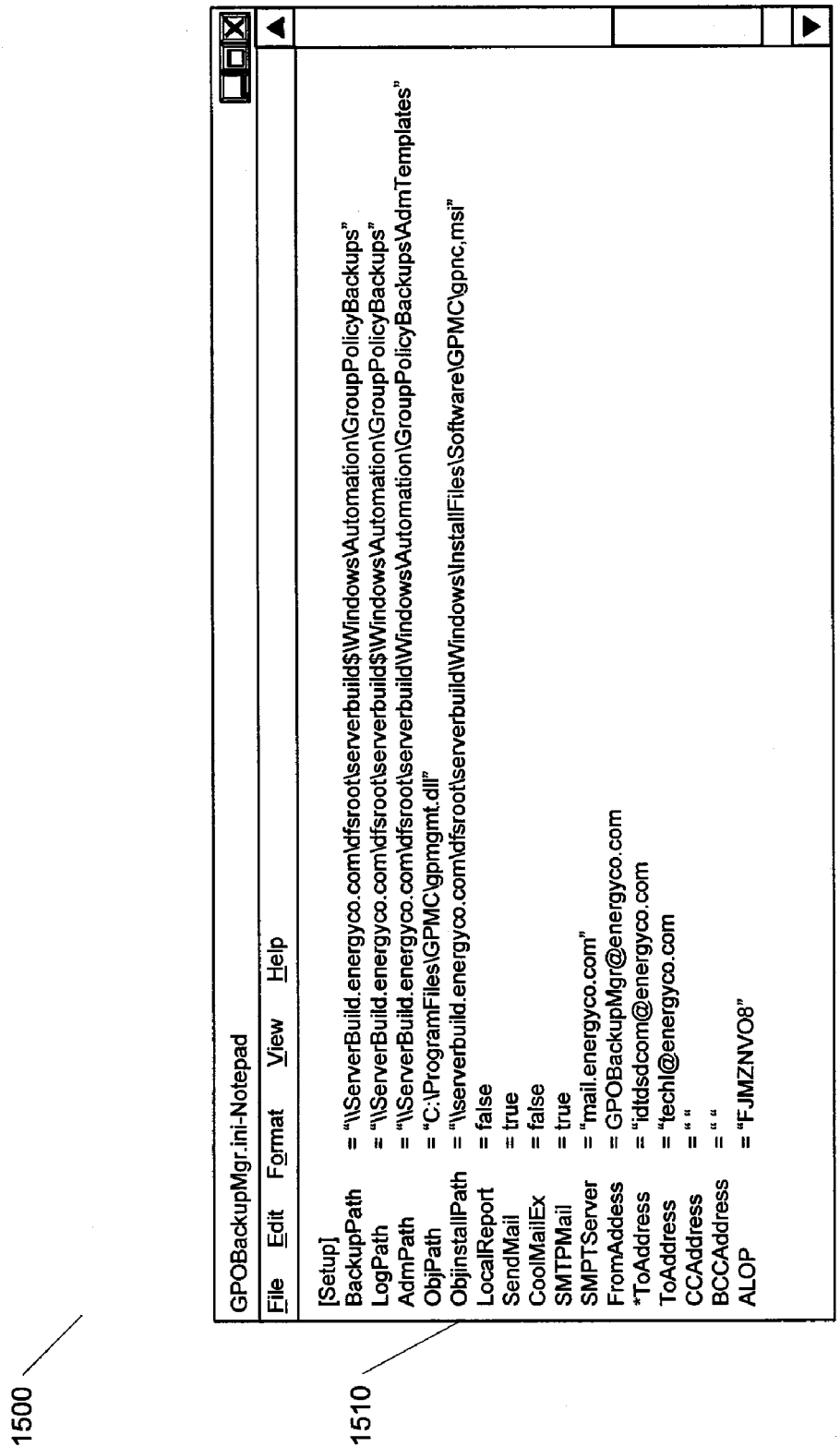
FIG. 15 illustrates an exemplary initialization configuration file for GPOBackupMgr.

FIG. 15 illustrates an exemplary initialization configuration file 1500 for GPOBackupMgr. The format of the configuration file contains one section, "setup" 1510, identified by square brackets.

The "setup" section contains very specific values that will modify the operation of GPOBackupMgr. The following is the list of definitions and explanations for each value.

BackupPath—specifies the full path to the network share to which the backups will be stored. This is the root path. GPOBackupMgr will create a special folder for each domain, group policy object and backup of that policy under this path.

AdmPath—specifies the location of the "gold" administrative template files which are used to format the group policy reports. GPOBackupMgr will use these templates to format the reports and difference reports during the backup process rather than the ones on the machine the process is being run from or those on the domain controller.

ObjPath—points to the location of the Microsoft group policy dynamic link library file required for the proper operation. Since the path listed by default is the location to which GPMC installs, this should not have to be changed unless the default installation of GPMC is changed. The default path is "C:\Program Files\GPMC\Microsoft.GroupPolicy.GpmgmtLib.dll".

ObjInstallPath—specifies the path to install GPMC. If the specified path is correct, the path will end in "gpmc.msi". The .msi file is used to install GPMC on the current machine if it is not already installed the first time GPOBackupMgr is run.

LocalReport—a simple Boolean "true" or "false" statement. LocalReport specifies whether GPOBackupMgr should attempt to write the current reports to the administrative (ADM) folder of the policy under the SysVol share on the primary domain controller. A "true" will cause GPOBackupMgr to attempt to write the report. A "false" will cause GPOBackupMgr to skip this step. This feature is offered as a switch because there are cases where the credentials used to backup the reports may have access to the Active Directory, therefore the policies for backup purposes, the same ID may not have the ability to write to the System32 folder on the primary domain controller (PDC).

SendMail—a Boolean setting which determines whether GPOBackupMgr will send an email report at the end of each backup cycle, if a backup is made, or if there were errors in the backup. The GPOBackupMgr utility has two methods by which it can send email: (1) CoolMailEx, a predefined COM object used for allowing email on a machine which may not have an email client installed, or (2) standard SMTP mail if an SMTP mail server is available. Some enterprises may prefer the more secure CoolMailEx COM object if the location where GPOBackupMgr will be running is not contained in a secure environment. The selection of SendMail is configurable via the Boolean statements which follow. It is possible to use both methods, in which case, multiple emails will be sent.

CoolMailEx—a Boolean setting that determines if the CoolMailEx COM object is used for sending email reports at the end of each backup cycle.

SMTPMail—a Boolean setting that determines if the standard SMTP mail process is used for sending email reports at the end of each backup cycle. Note that this requires the following setting of the SMTP server to be correct in order to be successful.

SMTPServer—the IP address, Domain Name Service (DNS) name or DNS canonical name (Cname) of an available SMTP server. This setting is required if SMTPMail is set to "true." An error will be generated in the log file if GPOBackup is not able to reach the address set here. If SMTPMail settings are correct, the log file will state "SMTP mail message sent" at the end of each backup cycle where there are successful backups and/or errors.

FromAddress—the address used by GPOBackupMgr when it sends an email message. This address will be placed in the "From" field of the message. This setting is required for the email function to work correctly.

ToAddress—the semi-colon delimited list of email addresses to which the email messages will be sent. This setting is required for the email function to work correctly.

CCAddress—an optional setting in the case where email addresses are desired to be "carbon copied" during the email process. If this is not desired, empty quotes or a blank after the equals sign should be used instead.

BCCAddress—an optional setting in the case where email addresses are desired to be "blind carbon copied" during the email process. If this is not desired, empty quotes or a blank after the equals sign should be used instead.

Subject—the entry that will be used on the "Subject" line of the email.

Message—the entry that will be the opening statement of the email message. The rest of the email will be automatically generated based upon specific backups and/or error messages as a result of the backup process.

ALOP—the "Application Log On Password" that is required for CoolMailEx to work correctly. This password will need to be registered with the COM object and will only work for GPOBackupMgr.exe.

Figure 16:
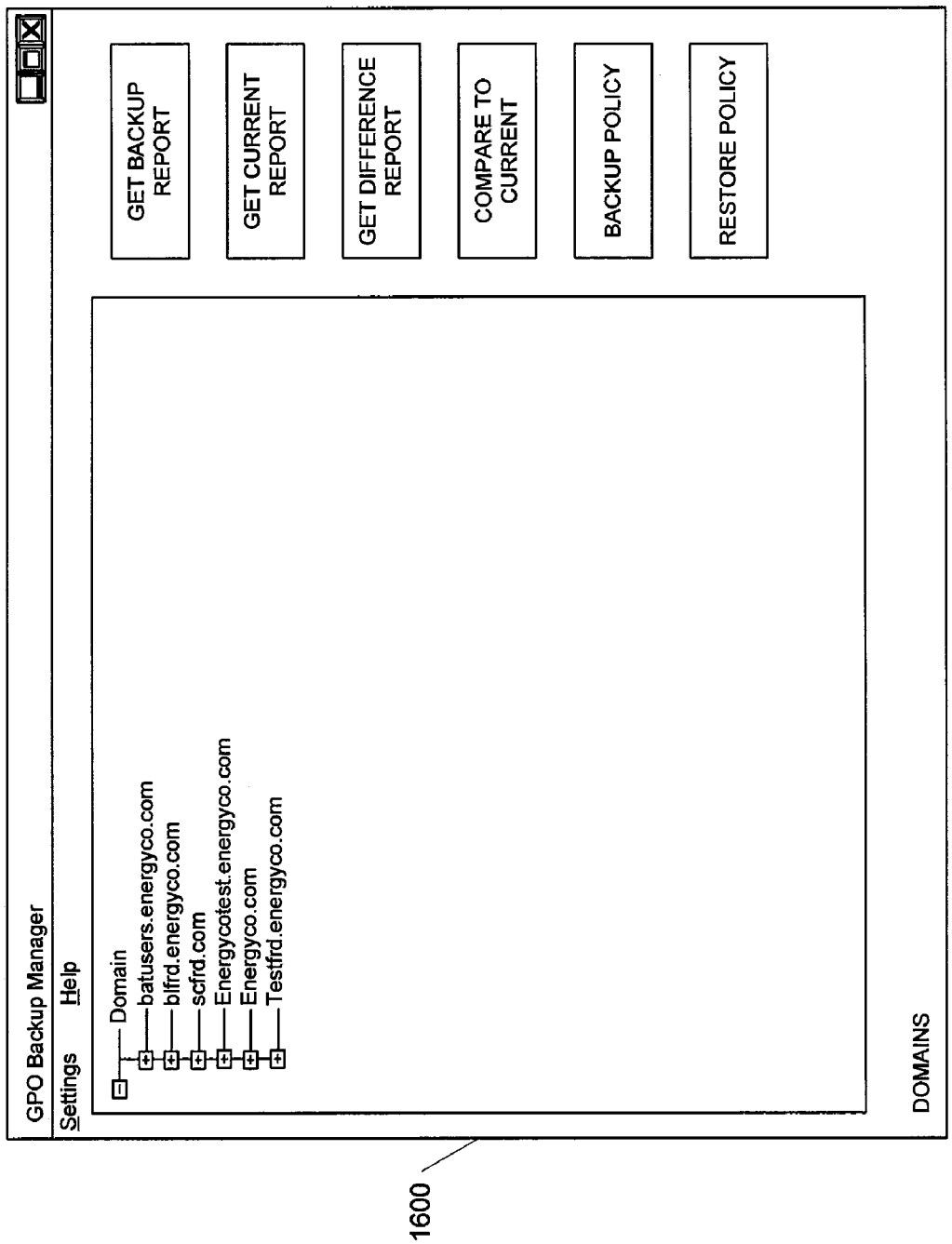
FIG. 16 illustrates an exemplary display showing a list of the domains that have had policy backups.

As illustrated in an exemplary display 1600 of FIG. 16, when the GPOBackupMgr component first comes up, it shows a list of the domains that have had policy backups. In order to see the policies for a particular domain, the user either clicks on the domain name or clicks the plus symbol adjacent the domain name. If there is no plus symbol next to the domain name, then no policies have been backed up for that domain.

Figure 17:
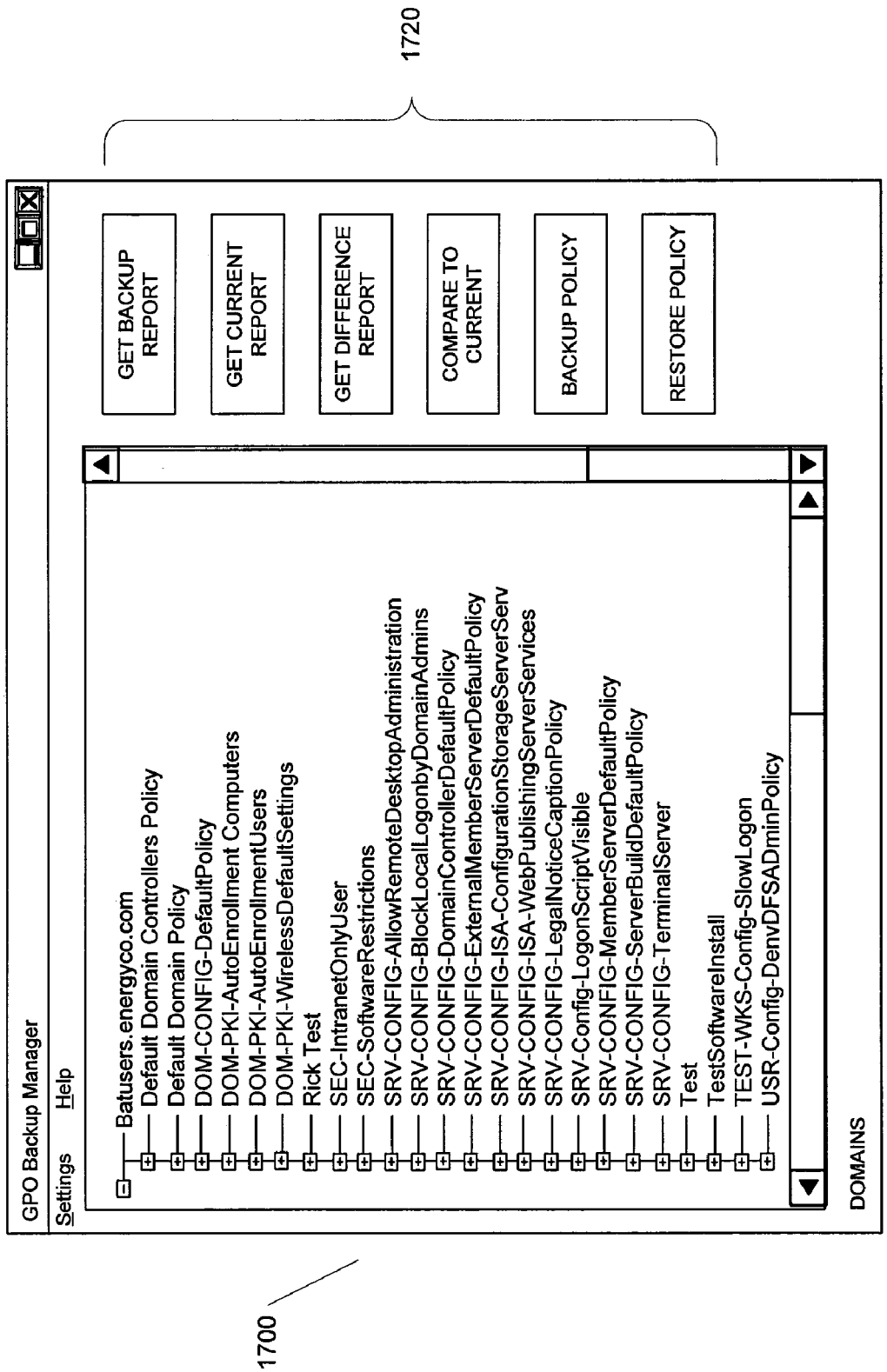
FIG. 17 illustrates an exemplary display showing the list of policies in a specific domain.

FIG. 17 illustrates an exemplary display 1700 showing the list of policies in a specific domain, e.g., Batusers.energyco-.com. None of the buttons 1720 displayed in FIG. 17 are enabled since no user selections have been made.

Figure 18:
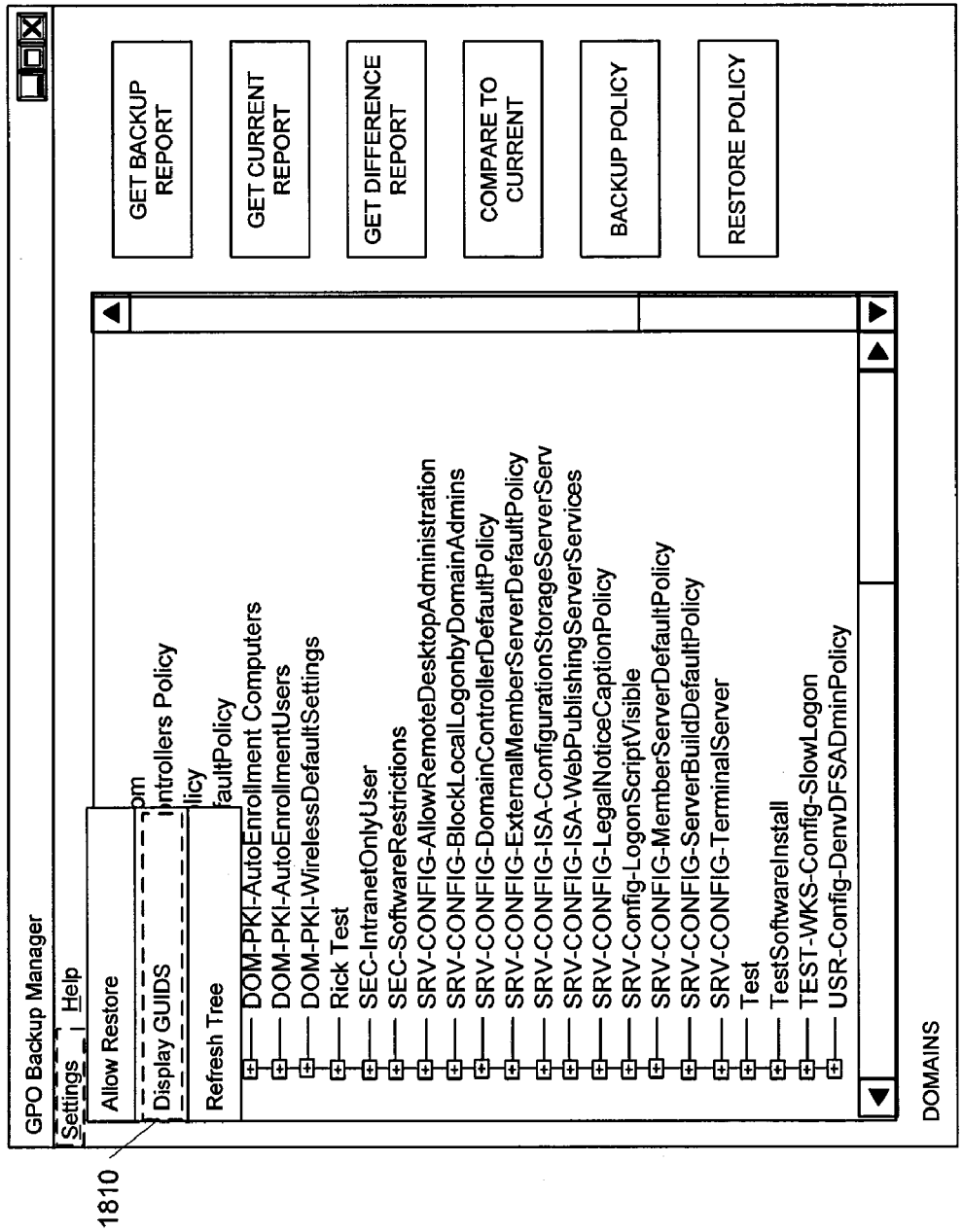
FIG. 18 illustrates the dropdown menu for "Settings" with "Display GUIDS" highlighted for the exemplary display of FIG. 17.

The user can also display the policy listing by GUID using the dropdown menu for "Settings" 1810 and selecting "Display GUIDS." This is illustrated in FIG. 18. This selection will cause the list to reload and the policy listing will be by GUID instead of display name.

Figure 19:
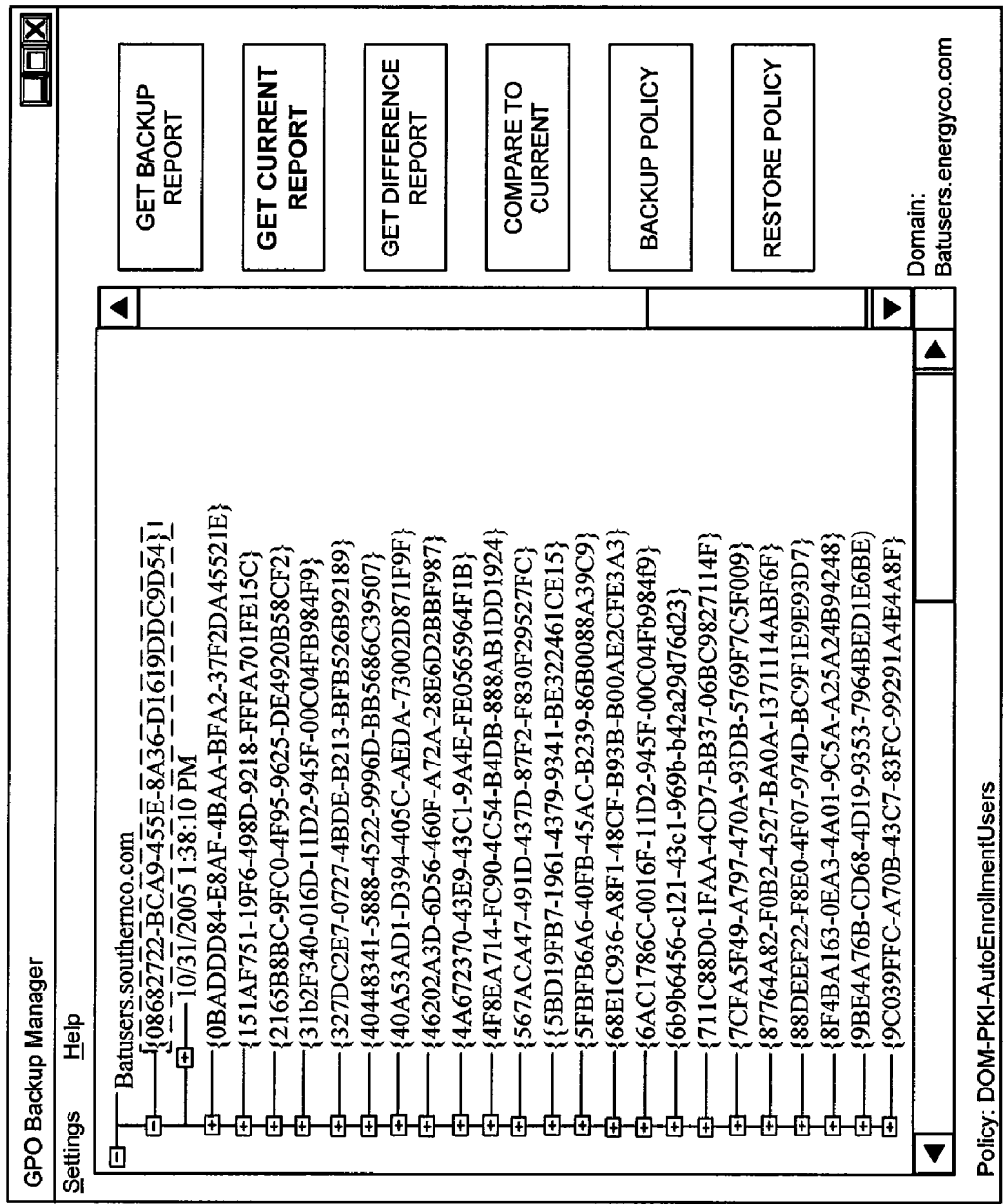
FIG. 19 illustrates an exemplary display showing the policy listing by globally unique identifier (GUID).
Figure 20:
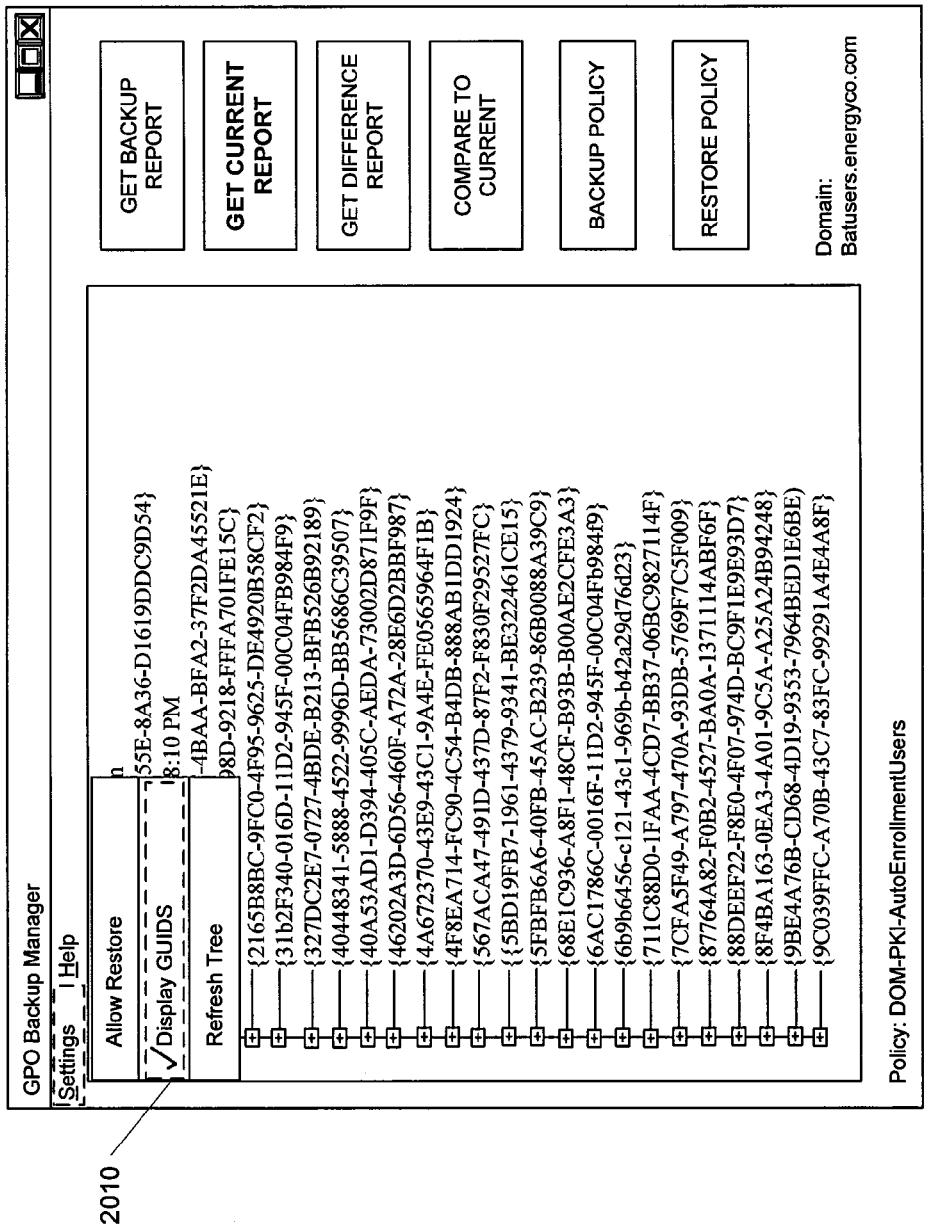
FIG. 20 illustrates the "Settings" dropdown menu with "Display GUIDS" checked for the exemplary display of FIG. 19.

FIG. 19 illustrates an exemplary display 1900 showing the policy listing by GUID. By selecting a policy GUID, the display name shows up in the status bar at the bottom of the display. To change back to the listing by display name, the user returns to the "Settings" dropdown menu 2010 and selects "Display GUIDS" again as illustrated in FIG. 20. The policy list then will be reinitialized by display name.

Figure 21:
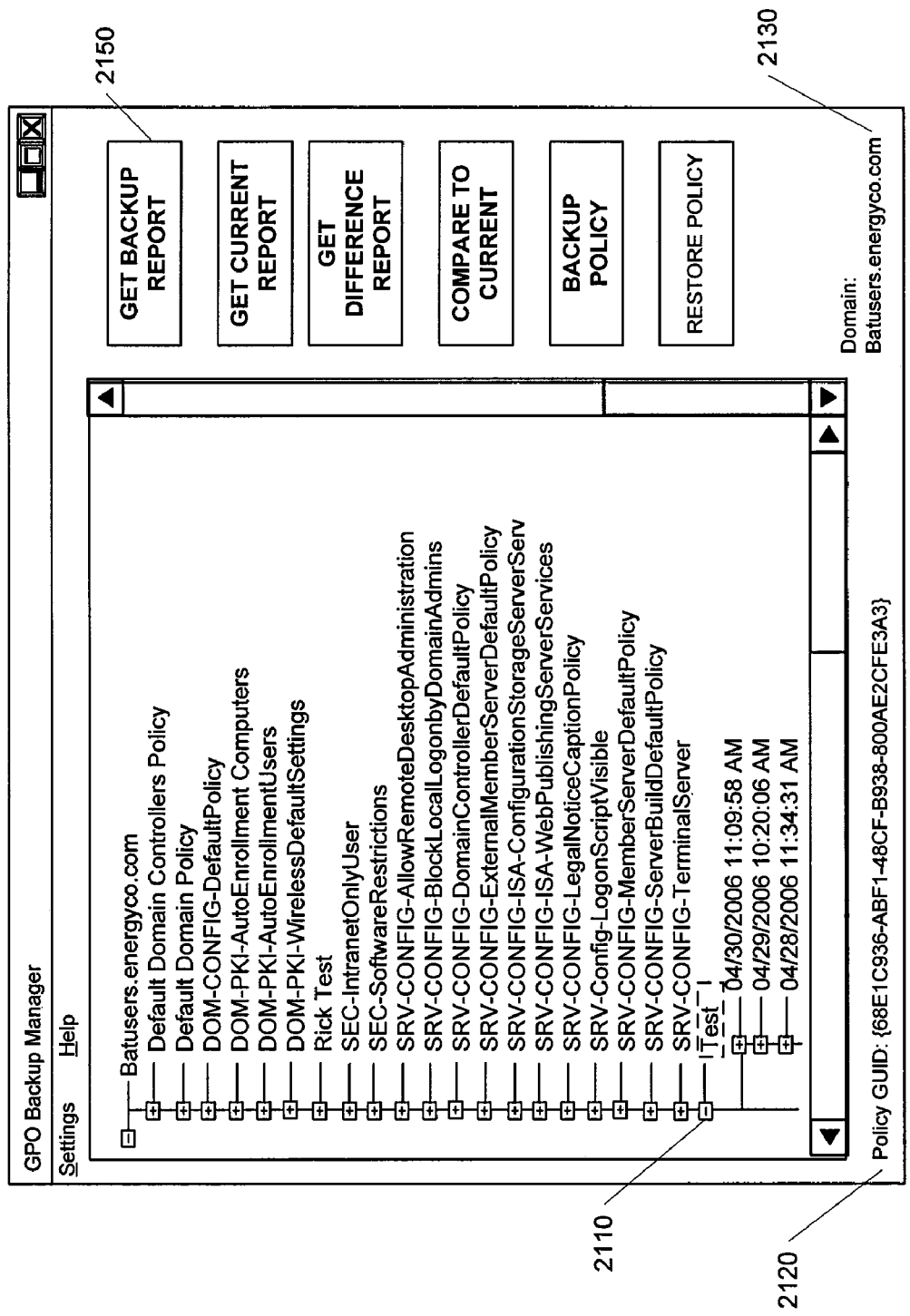
FIG. 21 illustrates an exemplary display of previous backups for a specific policy.

When the user clicks on a policy name 2110, the GUID is shown in the status bar 2120 at the bottom of the display as illustrated in FIG. 21. The domain 2130 that the user is currently working on is listed in the lower right corner of the display. Once the user clicks on a particular policy 2110, whether in GUID or display name mode, the list of all backups of that policy are shown. The latest one is always at the top and displayed in red. Each policy backup is listed by date and time stamp. When the user clicks on a backed-up policy 2210, the backup path 2220 is shown and the backup GUID 2230 is shown in the status bar at the bottom of the display as illustrated in FIG. 22.

Figure 22:
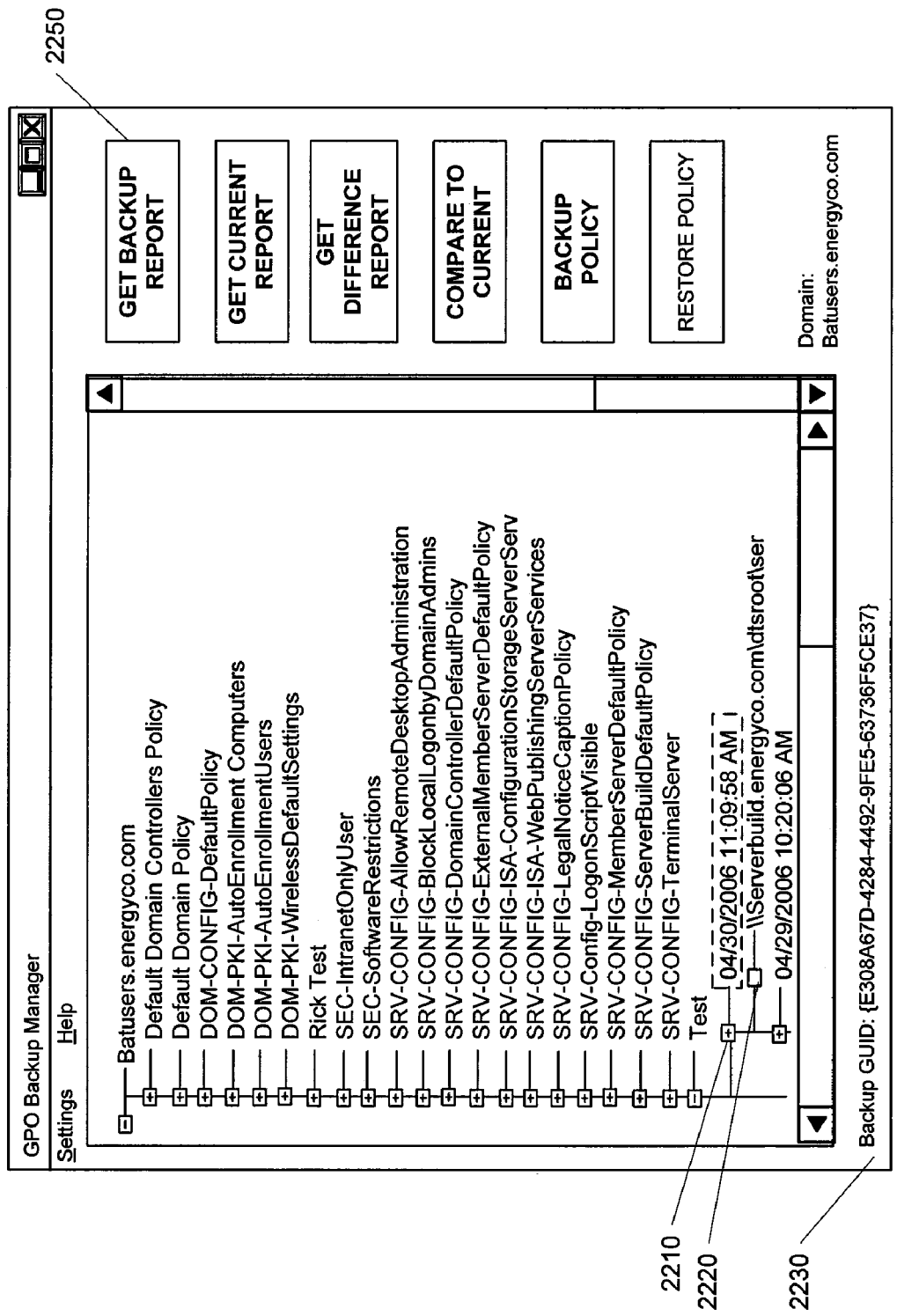
FIG. 22 illustrates an exemplary display showing selection of the most recent backup for a specific policy.
Figure 23:
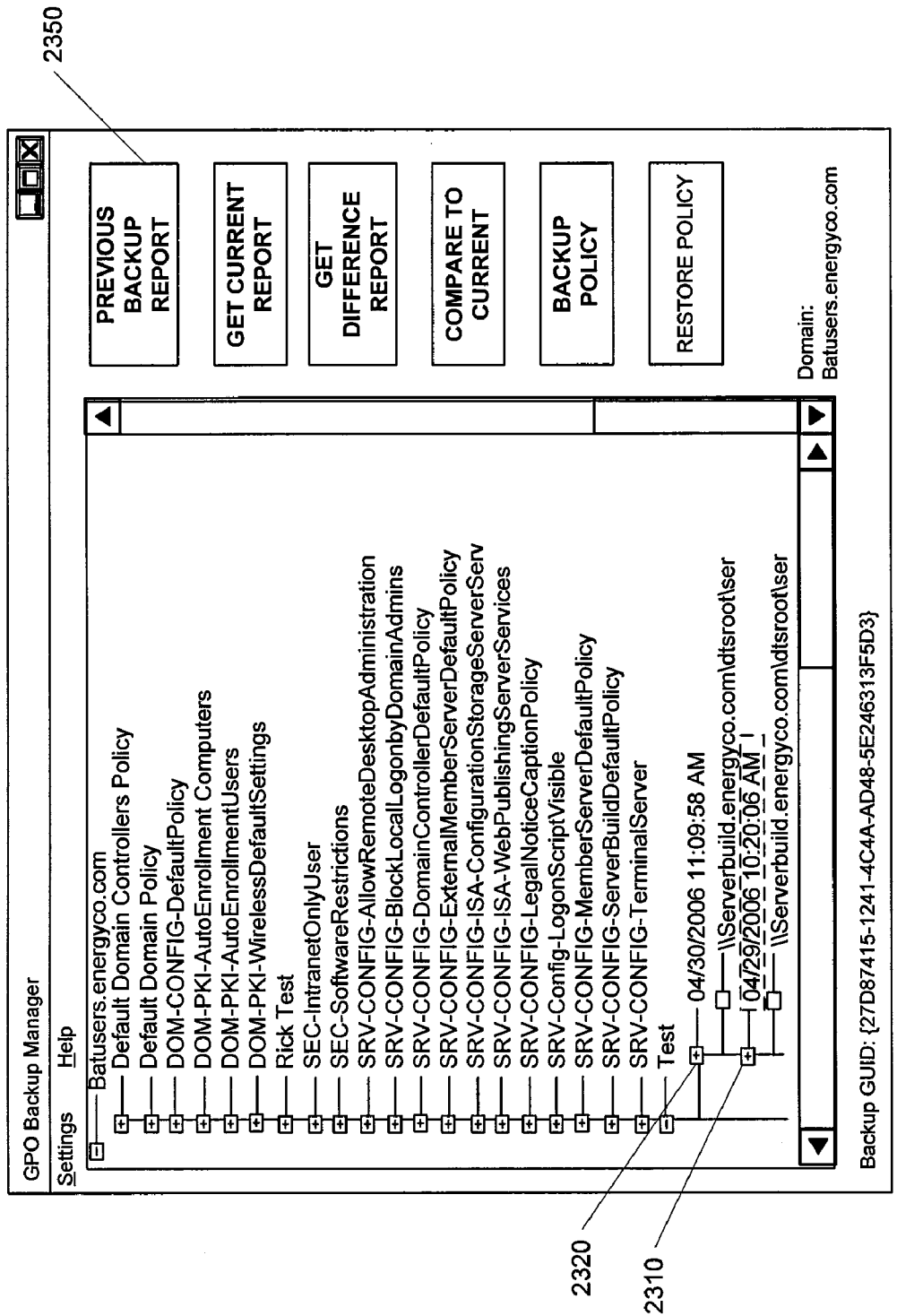
FIG. 23 illustrates an exemplary display showing selection of a previous backup for a specific policy.

In both FIGS. 21 and 22, most of the buttons on the right side of the display have been enabled. The first button 2150, 2250 in both of these figures reads "Get Backup Report." In FIG. 23, the top button 2350 reads "Previous Backup Report." This is because the buttons in GPOBackupMgr are sensitive to what is selected in the policy list. In this case, the previous backed-up policy 2310 has been selected instead of the most recent 2320. It should also be noted that the "Restore Policy" button is not enabled in FIGS. 21-23.

Figure 24:
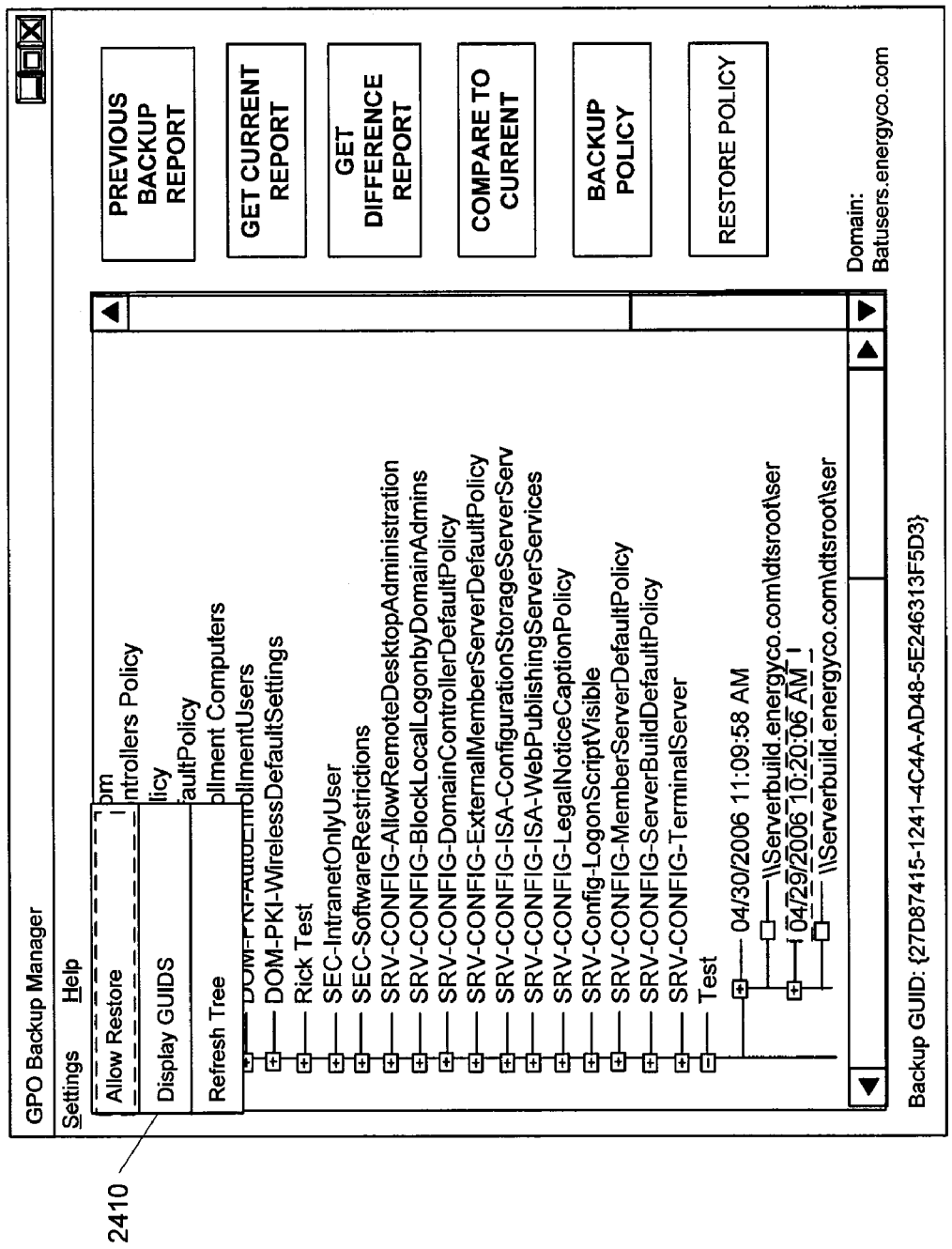
FIG. 24 illustrates the "Settings" drop down menu with the "Allow Restore" button selected for the exemplary display of FIG. 23.
Figure 25:
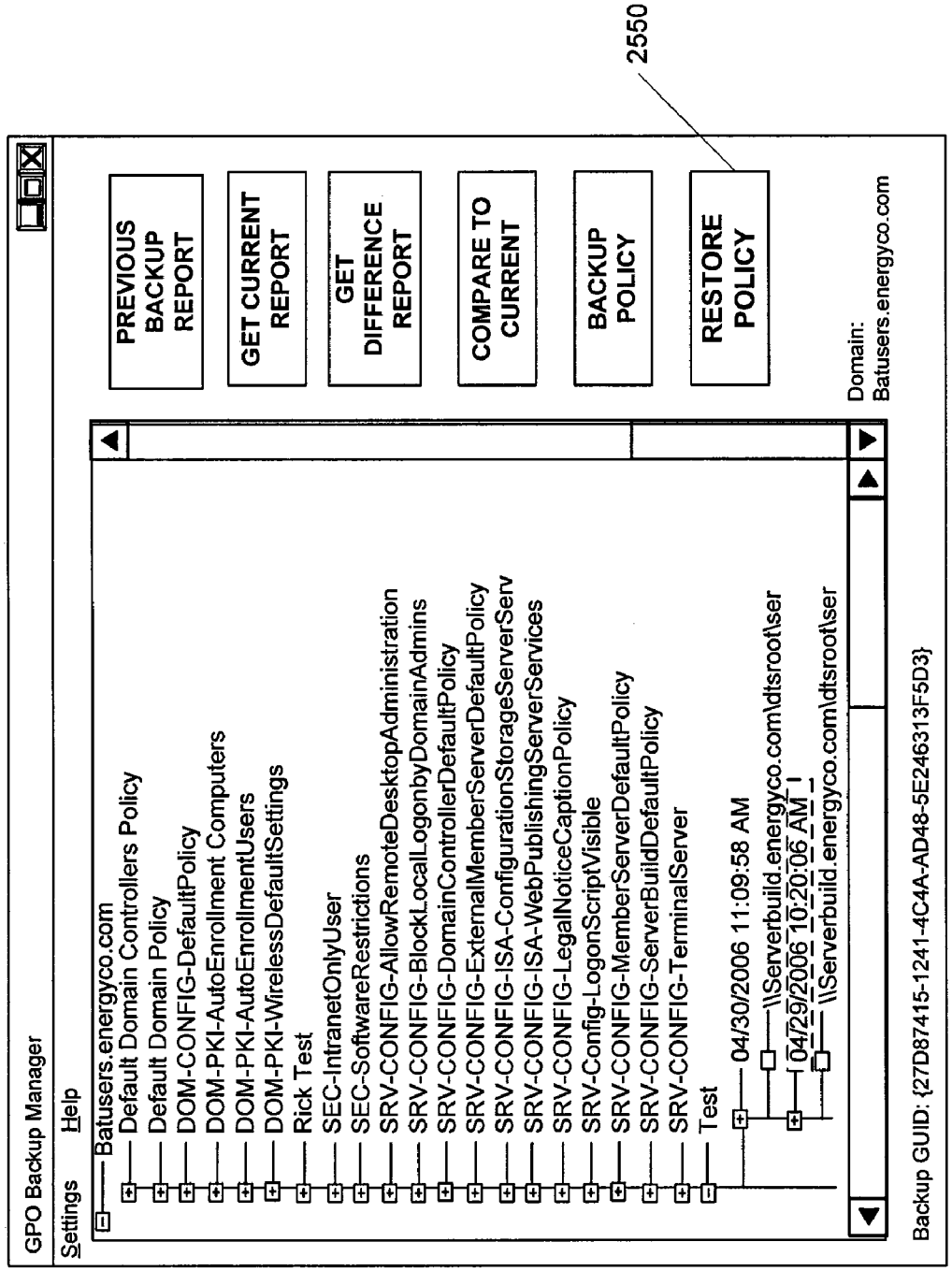
FIG. 25 illustrates an exemplary display by policy name with the "Restore Policy" button enabled.

In order to enable restores, the user selects "Allow Restore" from the "Settings" dropdown menu 2410 as illustrated in FIG. 24. The "Restore Policy" button 2550 then will be enabled as illustrated in FIG. 25. This is a security feature of the present invention in order to prevent an accidental restore of the wrong policy. A description of the GPO Backup Manager buttons is as follows:

Get Backup Report—when the latest GPO backup is selected under a policy, the top button on the form displays Get Backup Report. When the user clicks this button, the settings report for the selected policy as of the last backup will be created and launched.

Previous Backup Report—when any previous GPO backup is selected under a policy, the top button on the form displays Previous Backup Report. When the user clicks this button, the settings report for the selected policy at the time of the selected backup will be created and launched.

Get Current Report—clicking on this button will prepare and launch a settings report based on the GPO as it currently exists on the domain controllers. This button works in this way no matter which policy the user has selected under the selected GPO. If the user selects another GPO, then the current report will be for the current settings of the selected GPO.

Get Difference Report—selecting this button will generate a difference report between the current settings of a GPO on the domain controllers and the currently selected backup. If the user has selected the group policy name or GUID, then the difference report will be between the latest backup and the current settings.

Compare Current—selecting this button will result in a simple digital hash check of the selected backup and the current policy on the domain controllers and a report if they are the same. If they are not the same, a message box will display to the user offering to do a backup of the policy.

Backup Policy—selecting this button will result in a digital hash comparison of the current policy and the latest backup. If the two are in synchronization, a message will display to the user indicating that they match and asking the user if he still wants to perform a backup. If the user still wants to run a backup, then a backup will be performed in exactly the same manner as the automated GPOBackup process, complete with reports and emails. If the two are not in synchronization, then there will not be a user prompt and the backup will be performed immediately in the same manner. Once the backup is complete, the GPO list will refresh itself and the new backup will be available for review.

Restore Policy—selecting this button will restore the selected backup to the corresponding GPO on the primary domain controller. It will then generate an email report displaying the differences between the previous GPO settings and the restored settings. This button will only be enabled when specifically selected from the main settings menu.

Although the exemplary embodiment has been described in the context of a large Windows-based environment, the basic invention described herein is applicable to other types of network environments and operating systems in which policies implemented throughout a network are defined and arranged into group policy objects.

The system and method of the present invention have been described as computer-implemented processes. It is important to note, however, that those skilled in the art will appreciate that the mechanisms of the present invention are capable of being distributed as a program product in a variety of forms, and that the present invention applies regardless of the particular type of signal bearing media utilized to carry out the distribution. Examples of signal bearing media include, without limitation, recordable-type media such as diskettes or CD ROMs, and transmission type media such as analog or digital communications links.

The corresponding structures, materials, acts, and equivalents of all means plus function elements in any claims below are intended to include any structure, material, or acts for performing the function in combination with other claim elements as specifically claimed.

Those skilled in the art will appreciate that many modifications to the exemplary embodiment are possible without departing from the spirit and scope of the present invention. In addition, it is possible to use some of the features of the present invention without the corresponding use of the other features. Accordingly, the foregoing description of the exemplary embodiment is provided for the purpose of illustrating the principles of the present invention and not in limitation thereof since the scope of the present invention is defined solely by the appended claims.

What is claimed:

1. A method for group policy backup management in an enterprise network having a plurality of domains, comprising the steps of:

retrieving a list of group policy objects for a domain;

generating a configuration initialization file including a domains section
> identifying a plurality of domains that are to be backed up and a setup section specifying a plurality of values that control the backup of each policy object in each domain;

determining a digital signature for each policy object on a list of policies for the domain;

comparing the digital signature for each policy object with a corresponding previous digital signature for each policy;

determining if a current digital signature for each policy object matches the corresponding previous digital signature for each policy;

backing up each policy object having a current digital signature that does not match the corresponding previous digital signature; and repeating the steps of retrieving, determining a digital signature, comparing, determining policy object matches and backing up for each domain in the plurality of domains.

2. The method for group policy backup management of claim 1 further comprising the step of storing each policy object that does not have a corresponding previous digital signature.

3. The method for group policy backup management of claim 1 wherein the step of backing up each policy is performed only for each policy object having a current digital signature that does not match the corresponding previous digital signature.

4. The method for group policy backup management of claim 1 wherein the step of determining a digital signature for each policy object is performed by running a hash function on each policy.

5. The method for group policy backup management of claim 1 further comprising the step of generating a report containing the changes found in each group policy object that has been modified.

6. The method for group policy backup management of claim 1 further comprising the step of generating a difference report for the domain after each successful policy backup, the difference report including both a current report and a backed up report for each policy object in the domain.

7. The method for group policy backup management of claim 1 further comprising the step of generating a log file of the backup of each policy object.

8. The method for group policy backup management of claim 1 further comprising the step of selecting a time and frequency for running a backup of each policy object in the domain.

9. The method for group policy backup management of claim 1 further comprising the step of creating a globally unique identifier for each policy object in the domain.

10. The method for group policy backup management of claim 9 further comprising the step of accumulating backups for each policy object in the domain in a folder identified by the corresponding globally unique identifier.

11. A method for managing a group policy in an enterprise network having a plurality of domains, comprising the steps of:

generating a configuration initialization file including a domains section identifying a plurality of domains that are to be backed up and a setup section specifying a plurality of values that control the backup of each policy object in each domain;

receiving a user selection of a domain from the domains section;

receiving a user selection of an individual policy object from a displayed list of policy objects;

displaying each policy backup for the selected individual policy object; and receiving a user request that the individual policy object should be modified.

12. The method for managing a group policy of claim 11 further comprising receiving a user request that the individual policy object should be backed up.

13. The method for managing a group policy of claim 11 further comprising receiving a user request that the individual policy object should be restored from a previous backup of the individual policy object.

14. The method for managing a group policy of claim 11 wherein the displayed list of policies in the selected domain is displayed by policy name.

15. The method for managing a group policy of claim 11 wherein the displayed list of policies in the selected domain is displayed by a globally unique identifier for each policy object in the list.

16. The method for managing a group policy of claim 12 wherein backing up the individual policy object comprises determining a digital signature for the individual policy object.

17. The method for managing a group policy of claim 13 wherein restoring the individual policy object comprises replacing a current digital signature for the individual policy object with the digital signature of a previous backup of the individual policy object.

* * * * *